US010674554B2

(12) United States Patent
Takano

(10) Patent No.: US 10,674,554 B2
(45) Date of Patent: *Jun. 2, 2020

(54) DEVICE AND METHOD

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,002

(22) Filed: Apr. 23, 2018

(65) Prior Publication Data

US 2018/0249523 A1 Aug. 30, 2018

Related U.S. Application Data

(63) Continuation of application No. 15/116,762, filed as application No. PCT/JP2015/003567 on Jul. 14, 2015, now Pat. No. 9,974,102.

(30) Foreign Application Priority Data

Jul. 29, 2014 (JP) .................................. 2014-153812

(51) Int. Cl.
*H04W 76/14* (2018.01)
*H04W 72/04* (2009.01)
*H04L 5/14* (2006.01)

(52) U.S. Cl.
CPC ............... *H04W 76/14* (2018.02); *H04L 5/14* (2013.01); *H04W 72/042* (2013.01); *H04W 72/0446* (2013.01)

(58) Field of Classification Search
CPC ... H04W 72/085; H04W 48/18; H04W 74/08; H04W 72/042

USPC .................................................. 370/252-339
See application file for complete search history.

(56) References Cited

U.S. PATENT DOCUMENTS

| 2011/0255450 | A1 | 10/2011 | Wang et al. | |
|---|---|---|---|---|
| 2012/0082070 | A1* | 4/2012 | Hart ..................... | H04J 11/0023 370/280 |
| 2013/0142268 | A1 | 6/2013 | Gao et al. | |
| 2014/0098719 | A1 | 4/2014 | Kim et al. | |
| 2014/0334354 | A1 | 11/2014 | Sartori et al. | |

(Continued)

FOREIGN PATENT DOCUMENTS

| CN | 103069899 A | 4/2013 |
|---|---|---|
| JP | 2014-116732 | 6/2014 |
| WO | WO 2013/139299 A1 | 9/2013 |
| WO | 2014/180342 A1 | 11/2014 |

OTHER PUBLICATIONS

"Physical layer considerations on D2D communication", HTC, 3GPP TSG RAN WG1 Meeting #73, Agenda item: 6.2.7.4, R1-132654, Total 2 Pages, (May 20-24, 2013), XP050698406.

(Continued)

Primary Examiner — Iqbal Zaidi
(74) Attorney, Agent, or Firm — Xsensus LLP

(57) ABSTRACT

A device includes circuitry that dynamically changes an uplink/downlink configuration of a time division duplex (TDD) carrier. The circuitry notifies a terminal device of a radio resource for device-to-device communication appropriate for the uplink/downlink configuration. The radio resource is a radio resource of at least one uplink subframe of the uplink/downlink configuration.

20 Claims, 24 Drawing Sheets

(56) References Cited

U.S. PATENT DOCUMENTS

2015/0271862 A1* 9/2015 Lee .................. H04L 1/1812
                                                370/278
2016/0165616 A1* 6/2016 Ohwatari ............ H04W 72/082
                                                370/329

OTHER PUBLICATIONS

"3$^{rd}$ Generation Partnership Project; Technical Specification Group Radio Access Network; Study on LTE device to deivce proximity services; Radio aspects (Release 12)", 3GPP TR 36.843, V12.0.0, Total 49 Pages, (Mar. 2014).
International Search Report dated Sep. 30, 2015 in PCT/JP15/003567 Filed Jul. 14, 2015.
Office Action dated Oct. 17, 2017 in Singaporean Patent Application No. 11201606338U, 7 pages.
Office Action dated Dec. 12, 2017 in Japanese Patent Application No. 2014-153812, 8 pages (with English-language Translation).
CATT, Resource allocation for Type 1 D2D discovery, 3GPP TSG RAN WG1 Meeting #76bis R1-141195, Mar. 31-Apr. 4, 2014, 7 pages (with cover page).
Samsung, Considerations on D2D resources, 3GPP TSG RAN WG1 Meeting #73 R1-131992, May 20-24, 2013, 4 pages (with cover page).
Japanese Office Action dated Aug. 14, 2018 in Japanese Application No. 2014-153812.
Chinese Office Action dated Aug. 1, 2019, issued in corresponding Chinese Patent Application No. 201580007445.5.

* cited by examiner

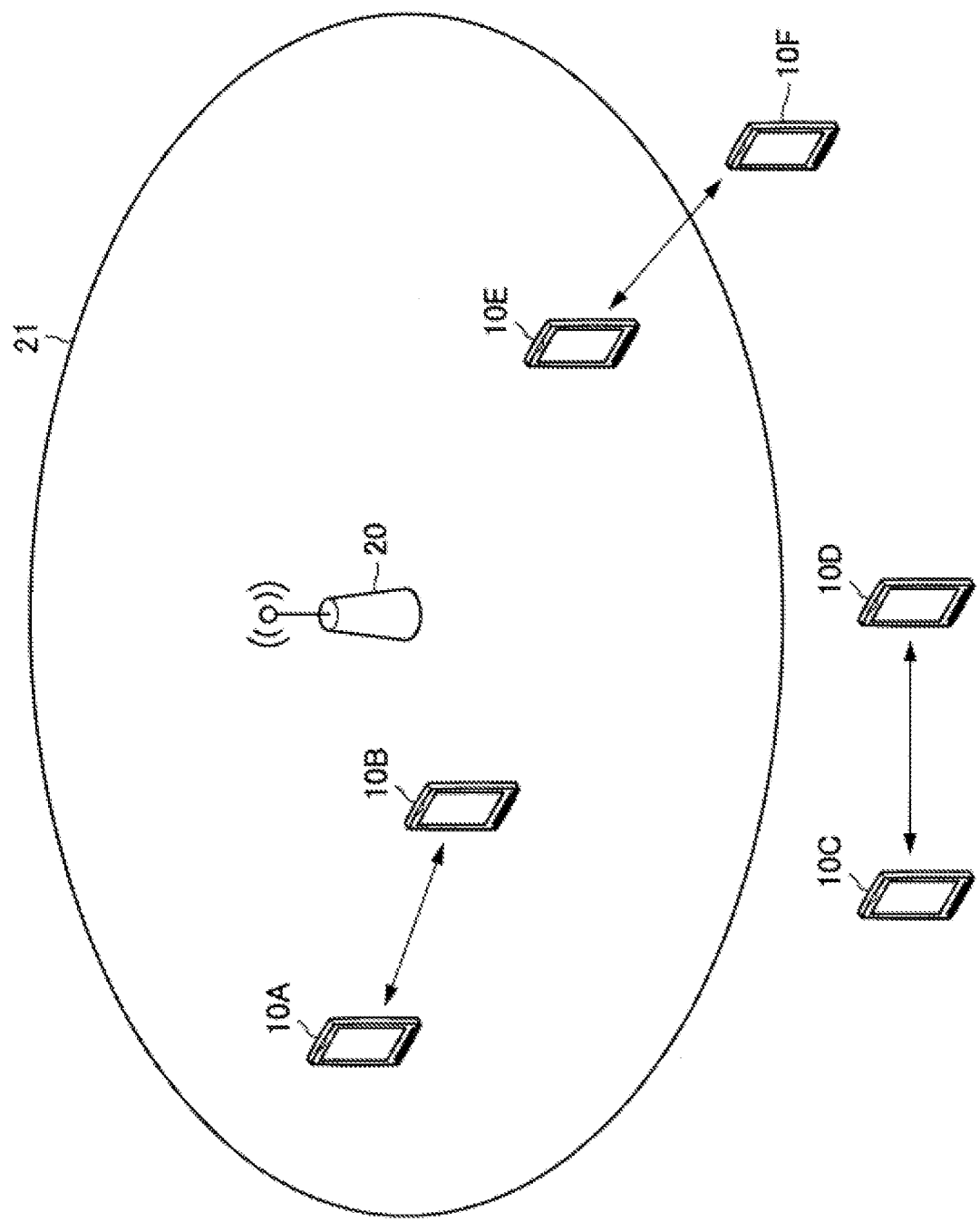
[Fig. 1]

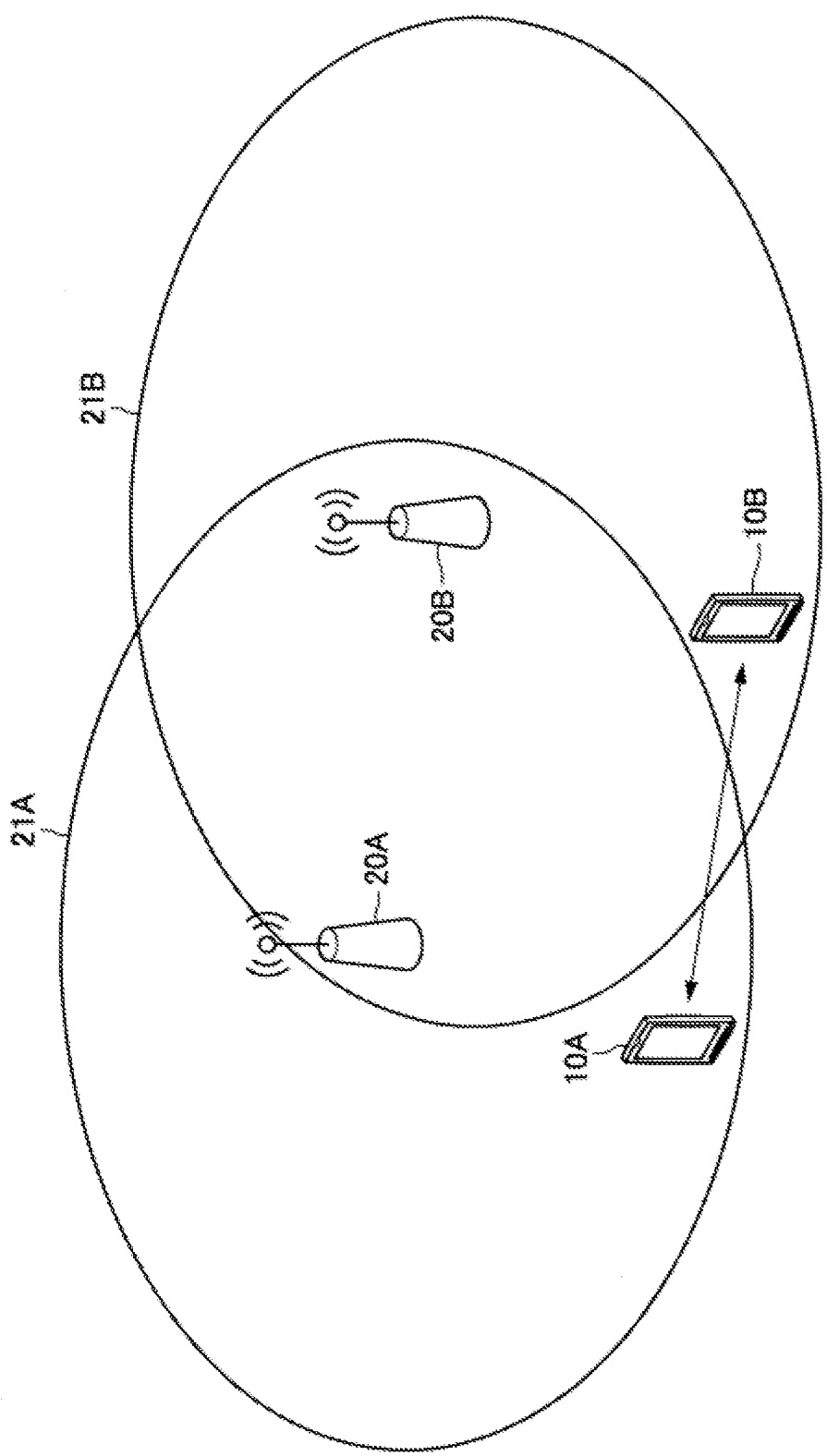
[Fig. 2]

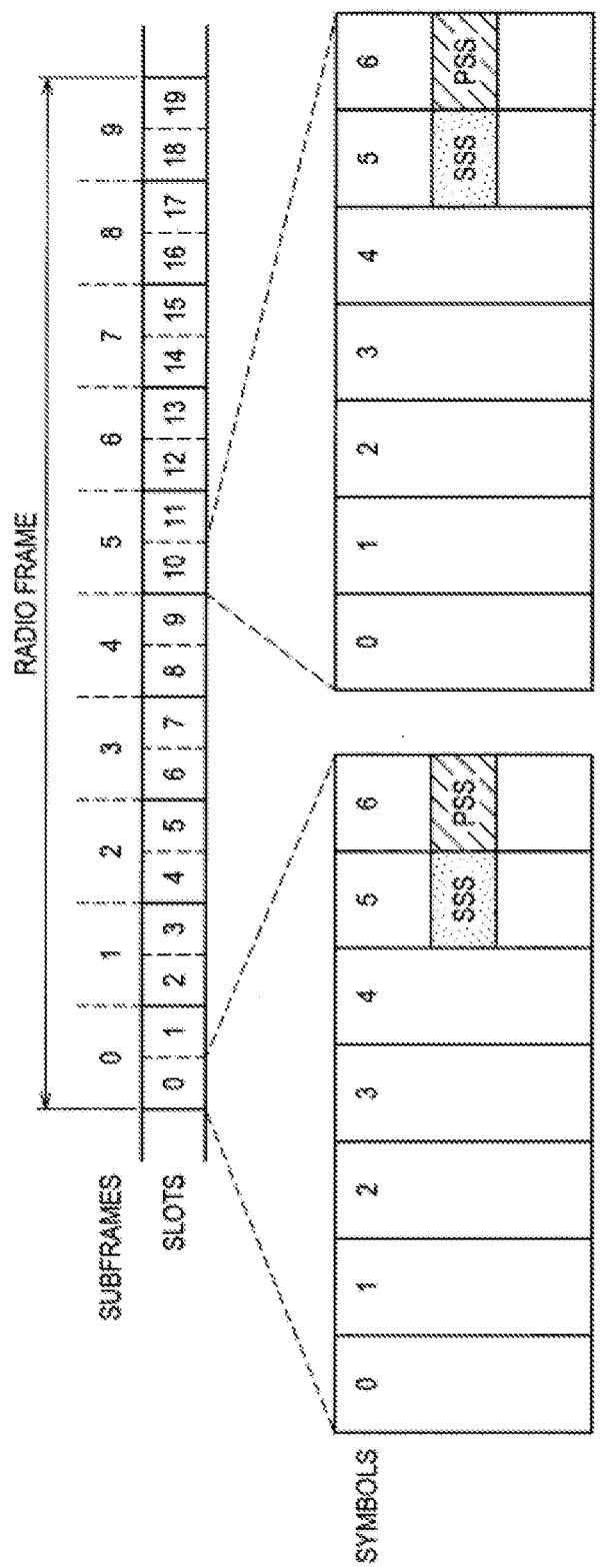
[Fig. 3]

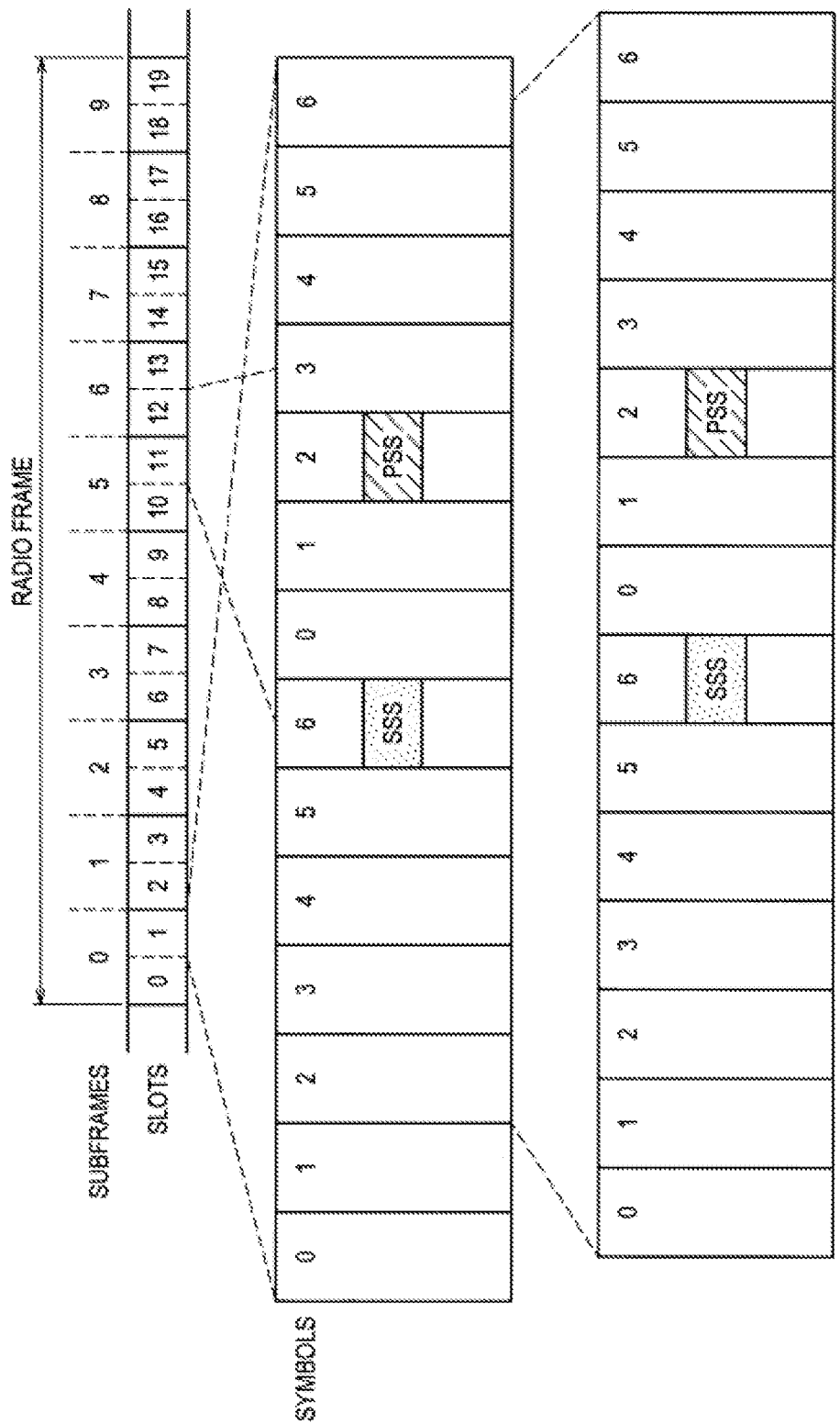
[Fig. 4]

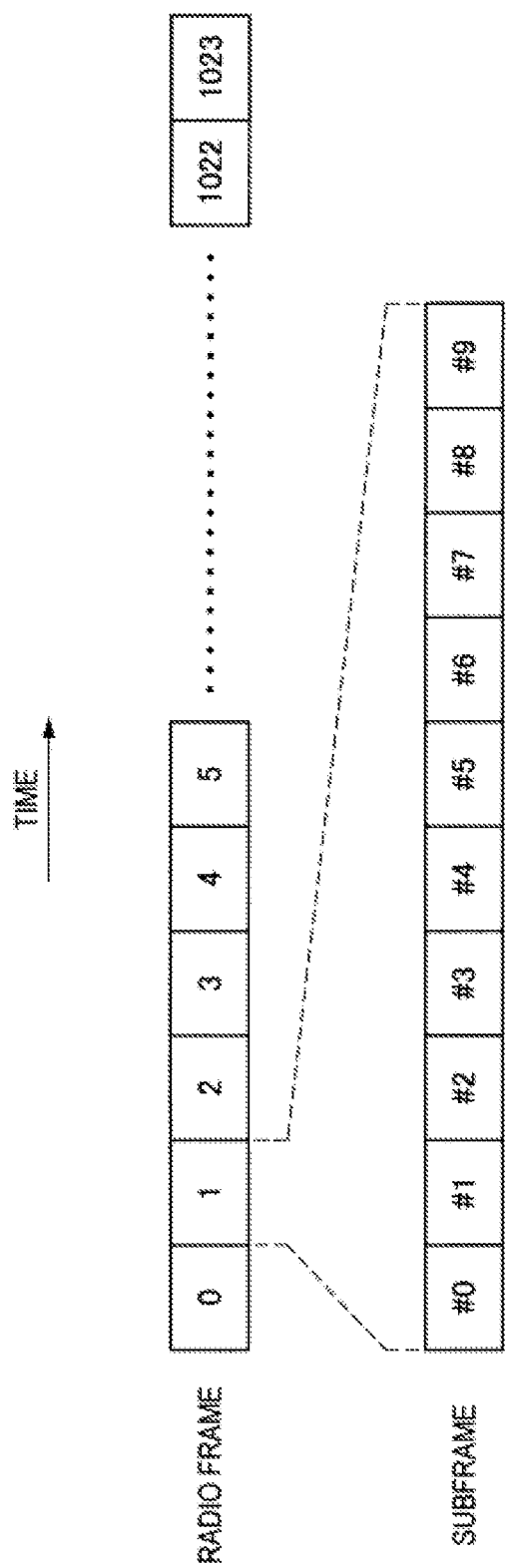
[Fig. 5]

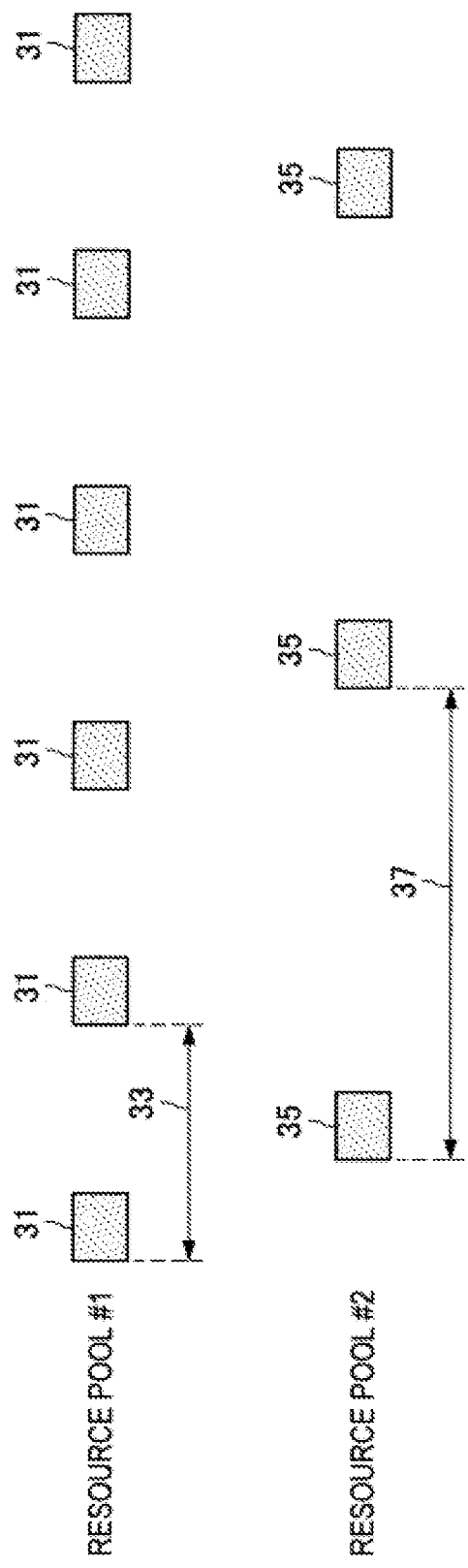

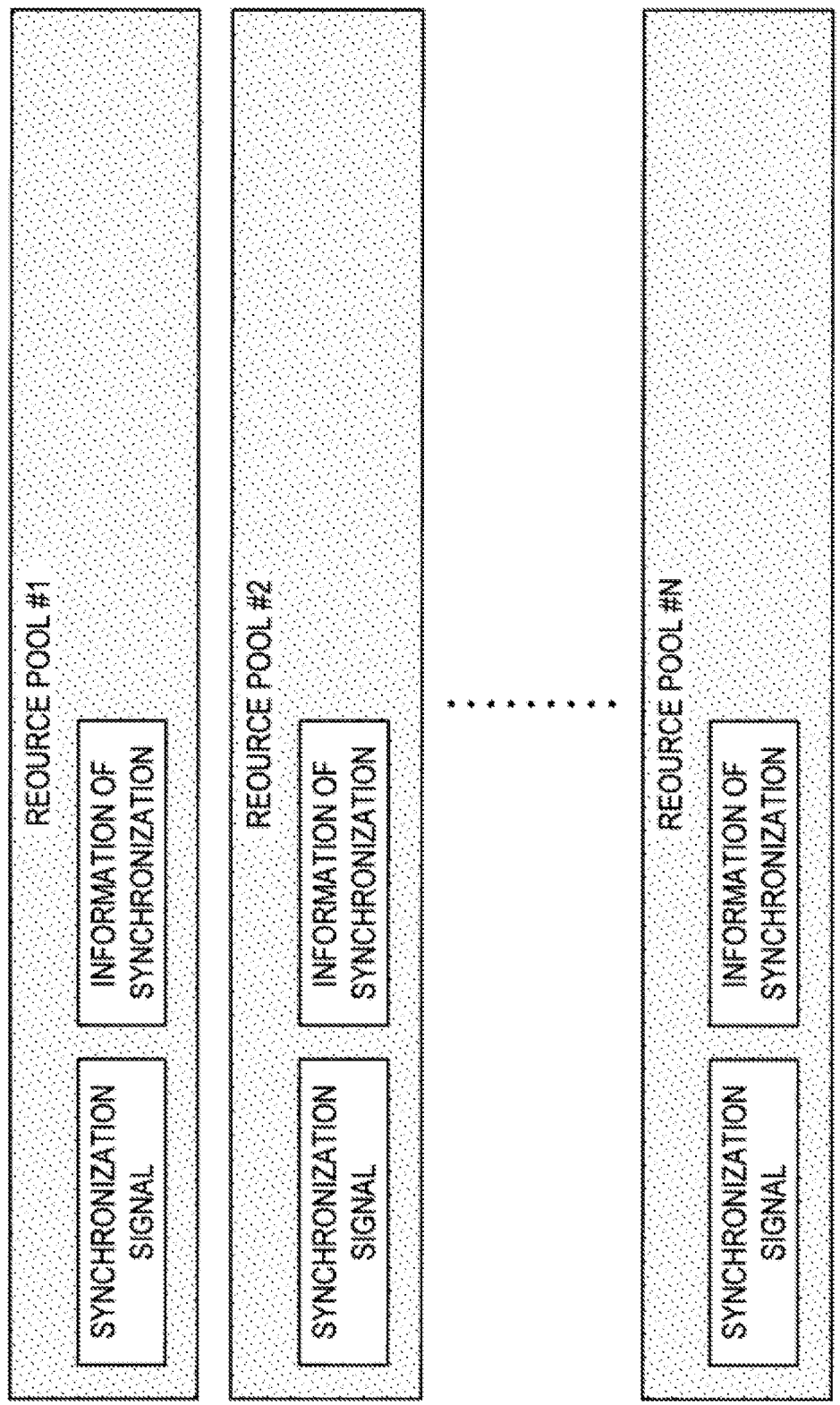
[Fig. 7]

| | #0 D | #1 S | #2 U | #3 U | #4 U | #5 D | #6 S | #7 U | #8 U | #9 U |
|---|---|---|---|---|---|---|---|---|---|---|
| CONFIGURATION 0 | #0 D | #1 S | #2 U | #3 U | #4 U | #5 D | #6 S | #7 U | #8 U | #9 U |
| CONFIGURATION 1 | #0 D | #1 S | #2 U | #3 U | #4 D | #5 D | #6 S | #7 U | #8 U | #9 D |
| CONFIGURATION 2 | #0 D | #1 S | #2 U | #3 D | #4 D | #5 D | #6 S | #7 U | #8 D | #9 D |
| CONFIGURATION 3 | #0 D | #1 S | #2 U | #3 U | #4 U | #5 D | #6 D | #7 D | #8 D | #9 D |
| CONFIGURATION 4 | #0 D | #1 S | #2 U | #3 U | #4 D | #5 D | #6 D | #7 D | #8 D | #9 D |
| CONFIGURATION 5 | #0 D | #1 S | #2 U | #3 D | #4 D | #5 D | #6 D | #7 D | #8 D | #9 D |
| CONFIGURATION 6 | #0 D | #1 S | #2 U | #3 U | #4 U | #5 D | #6 S | #7 U | #8 U | #9 D |

[Fig. 8]

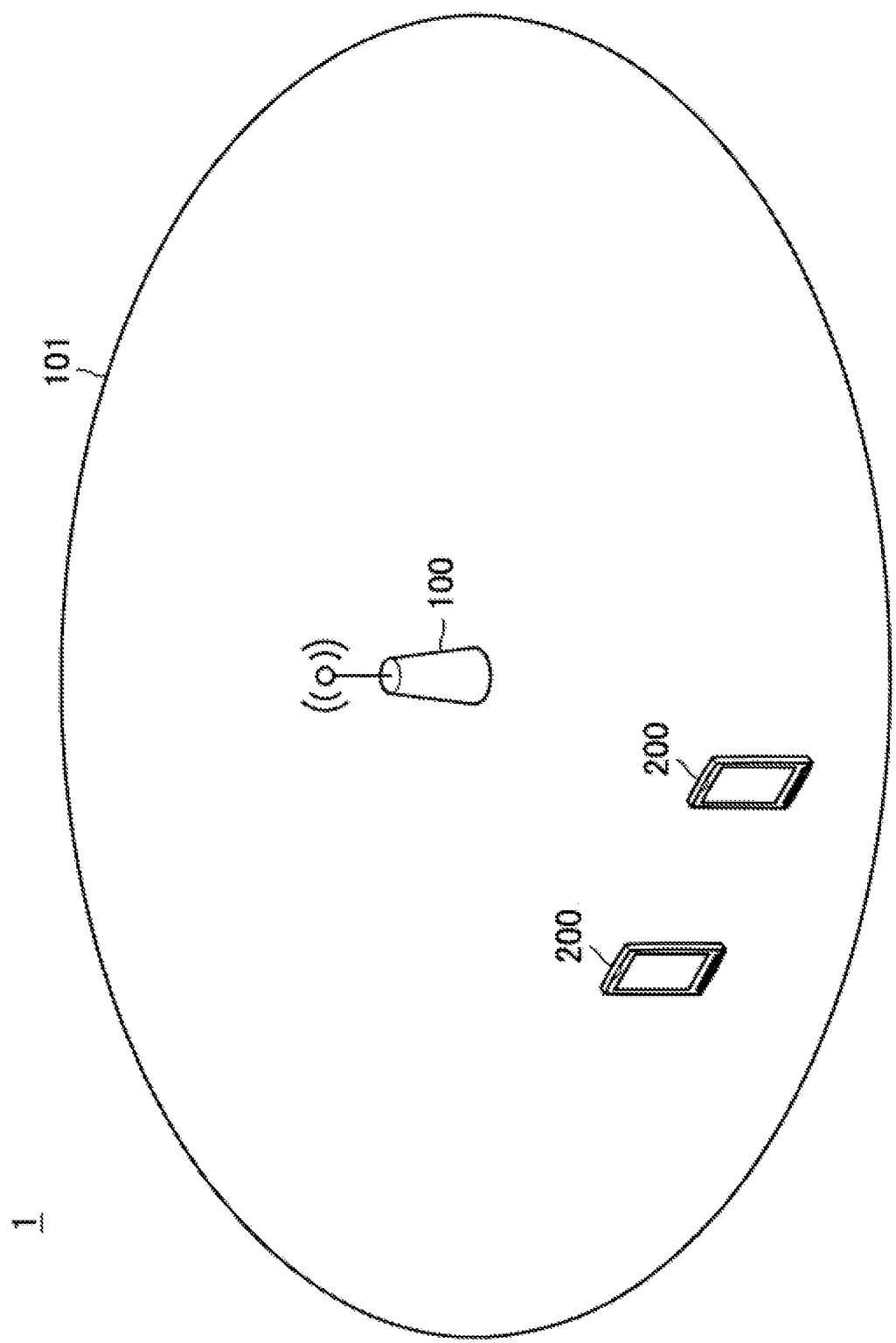
[Fig. 9]

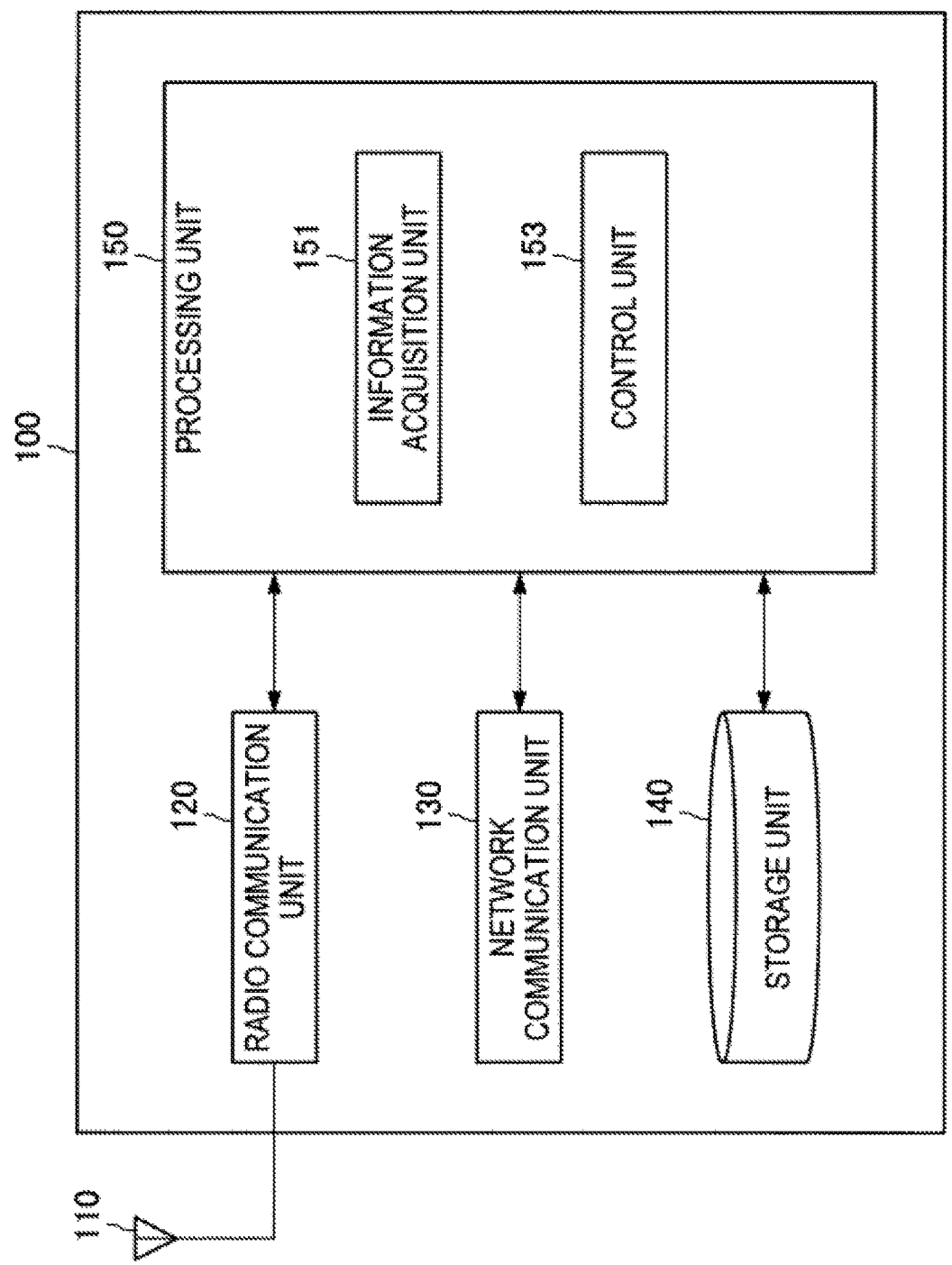

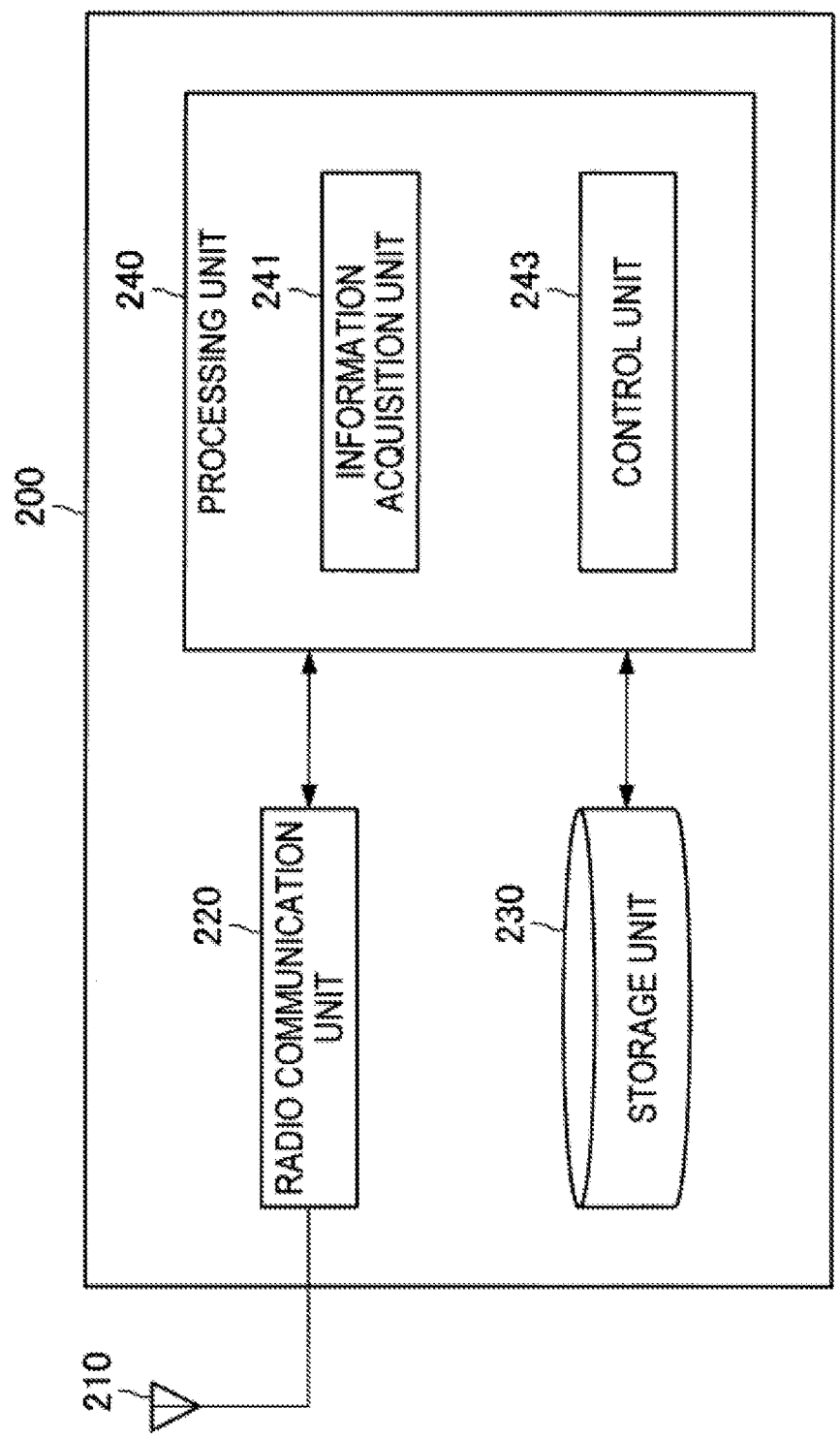
[Fig. 11]

[Fig. 12]

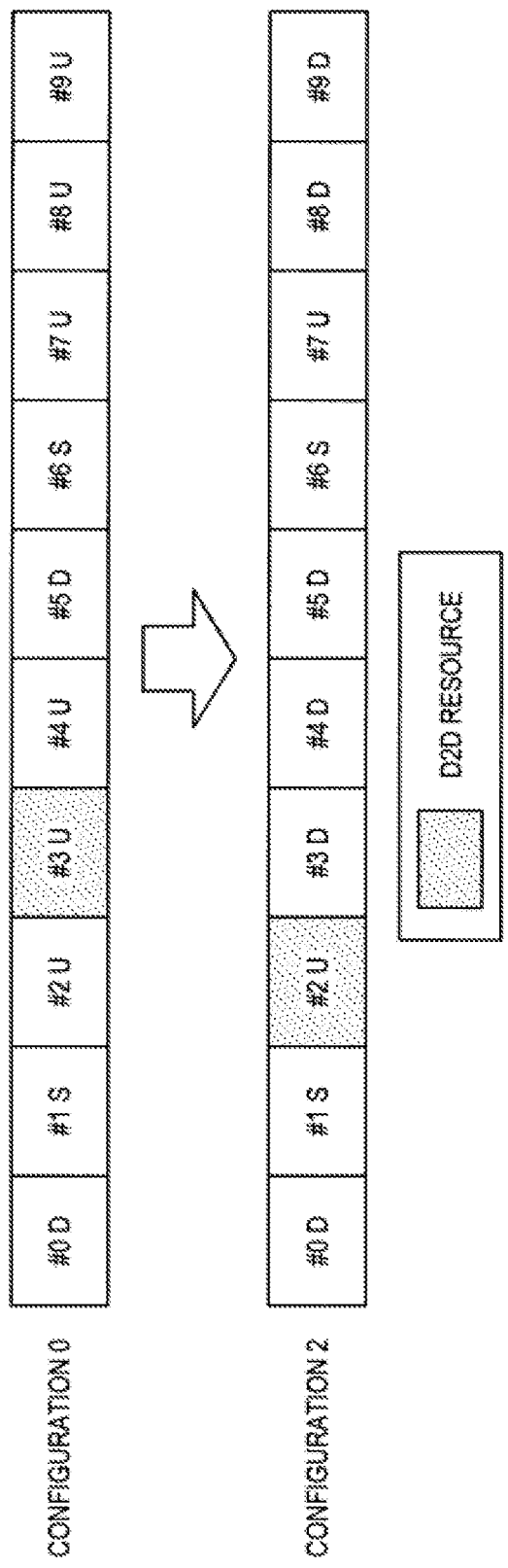
[Fig. 13]

| CONFIGURATION | PERIOD | SUBFRAME |
|---|---|---|
| #0 | 100 ms | #3 |
| #1 | 100 ms | #3 |
| #2 | 200 ms | #2 |
| #3 | 200 ms | #3 |
| #4 | 200 ms | #3 |
| #5 | 400 ms | #2 |
| #6 | 100 ms | #3 |

[Fig. 19]

| CONFIGURATION | PERIOD | SUBFRAME |
|---|---|---|
| #0 | 400 ms | #3,#7 |
| #1 | 400 ms | #3,#7 |
| #2 | 200 ms | #2 |
| #3 | 200 ms | #3 |
| #4 | 200 ms | #3 |
| #5 | 200 ms | #2 |
| #6 | 400 ms | #3,#7 |

[Fig. 20]
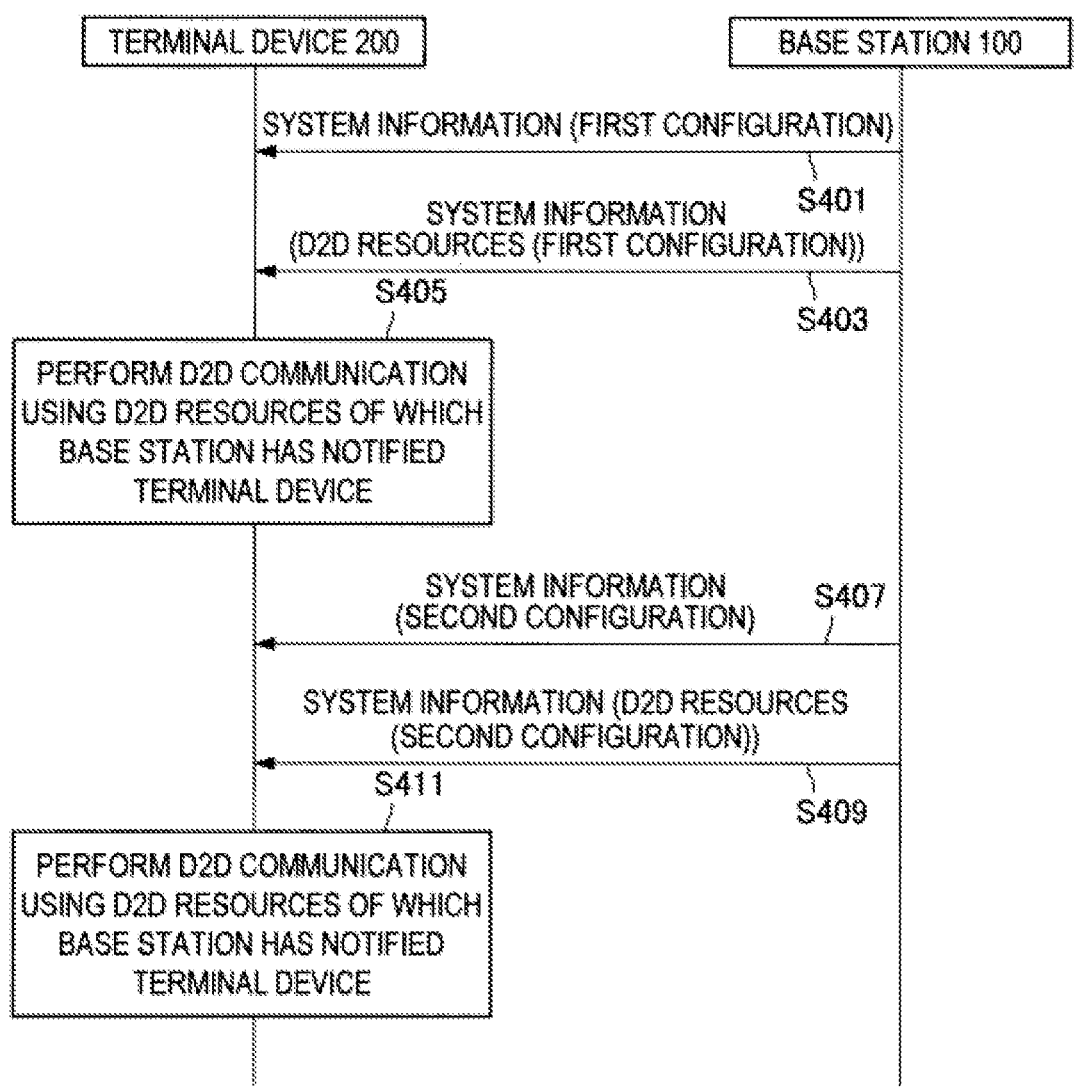

[Fig. 21]
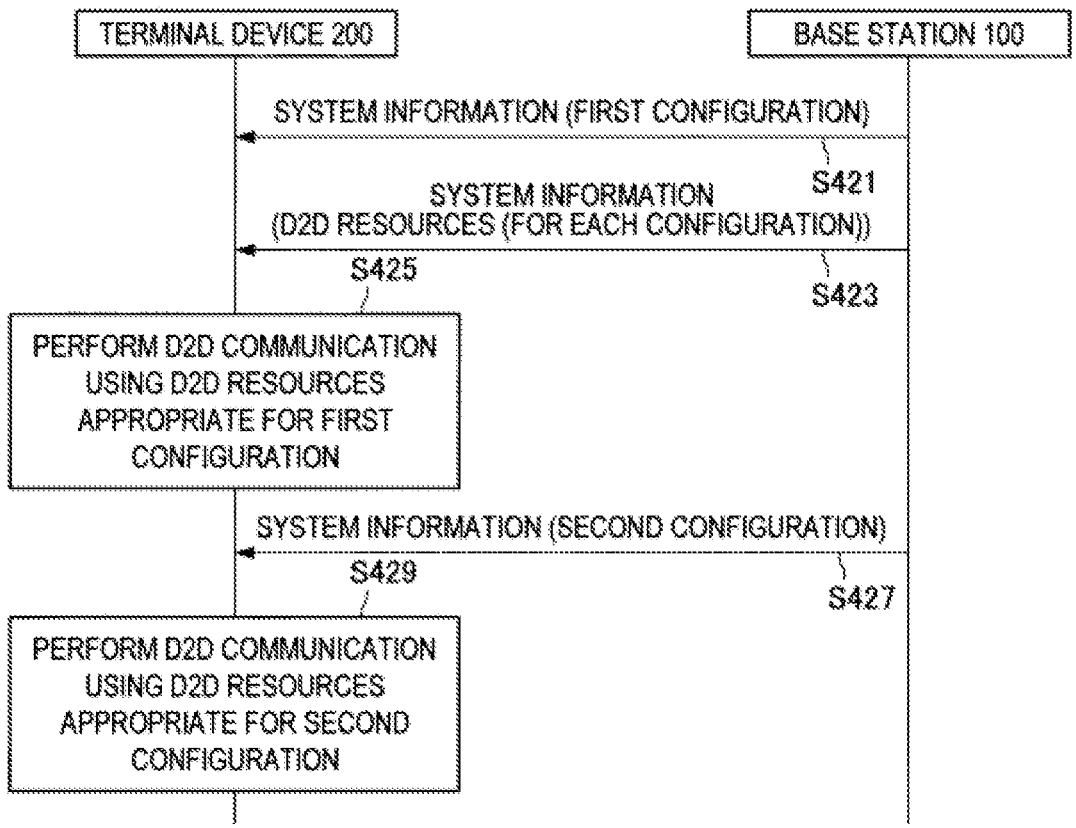
[Fig. 22]
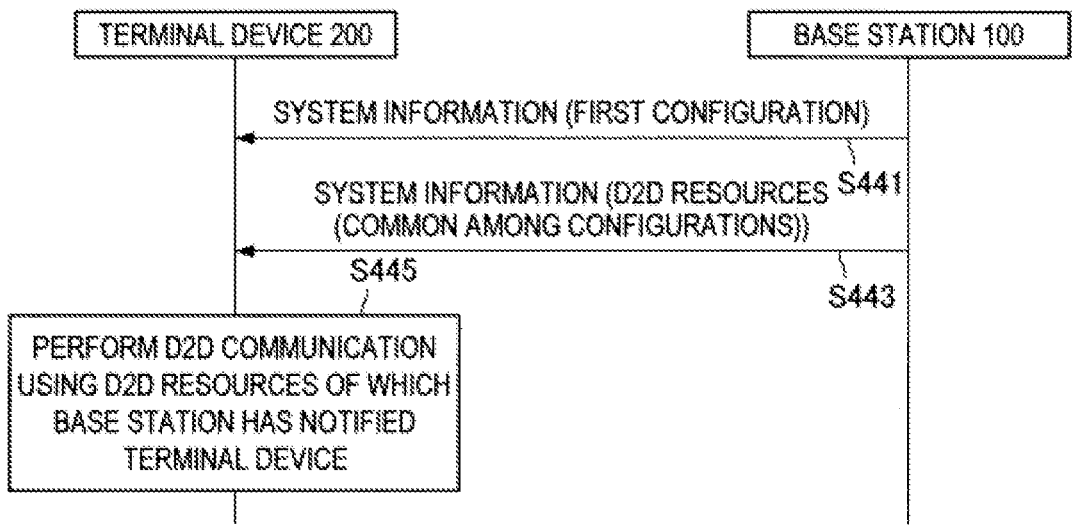

[Fig. 23]
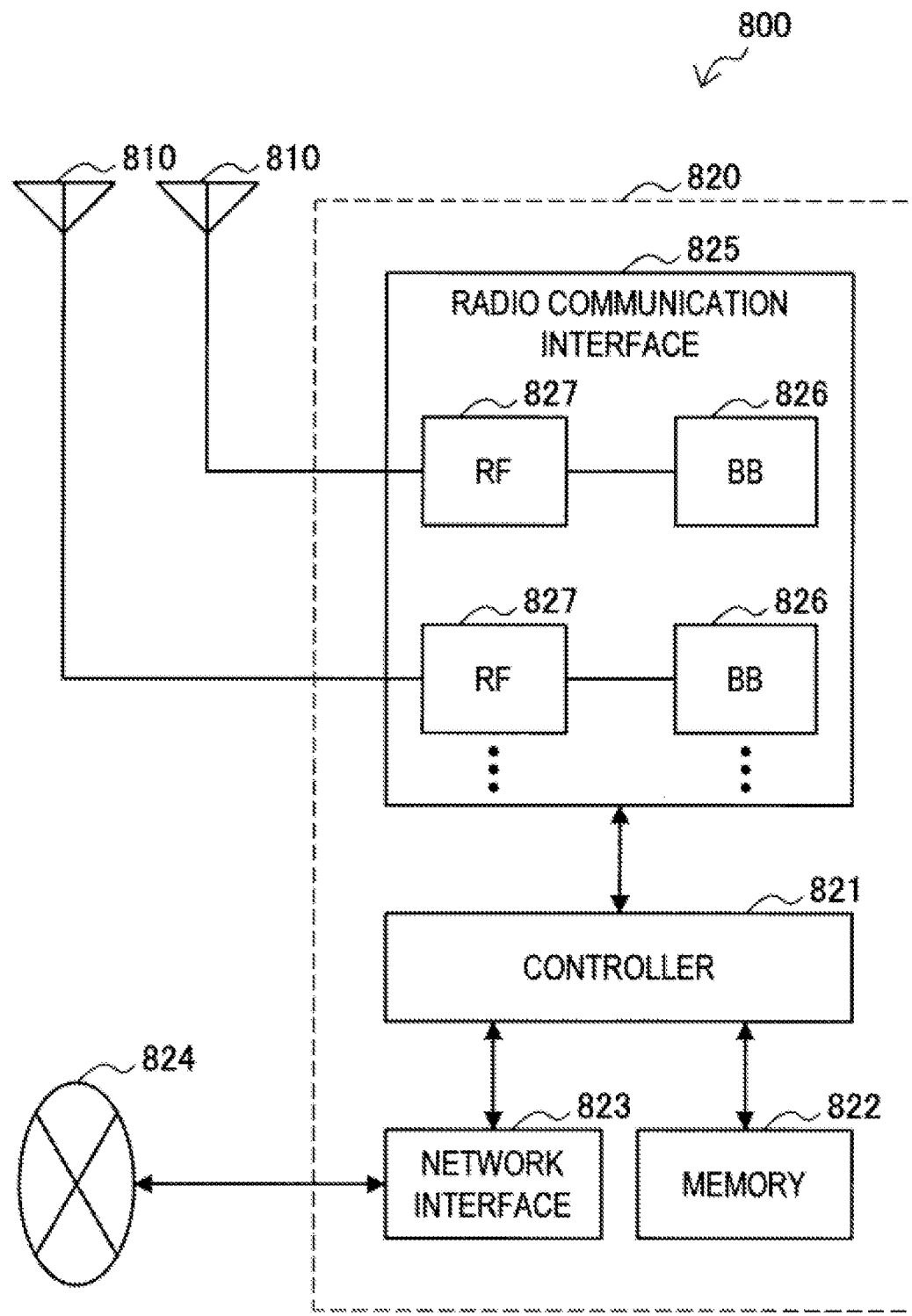

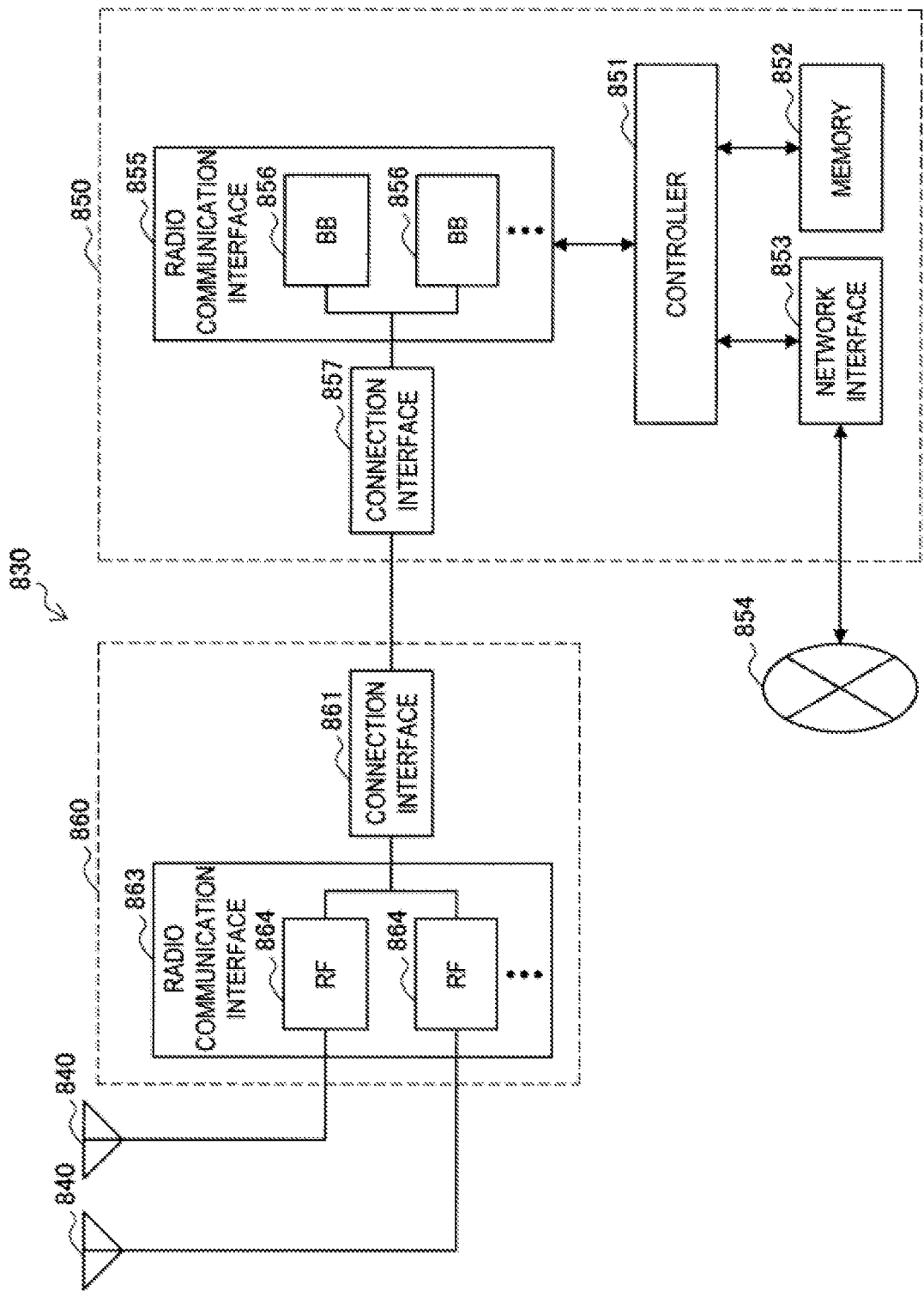
[Fig. 24]

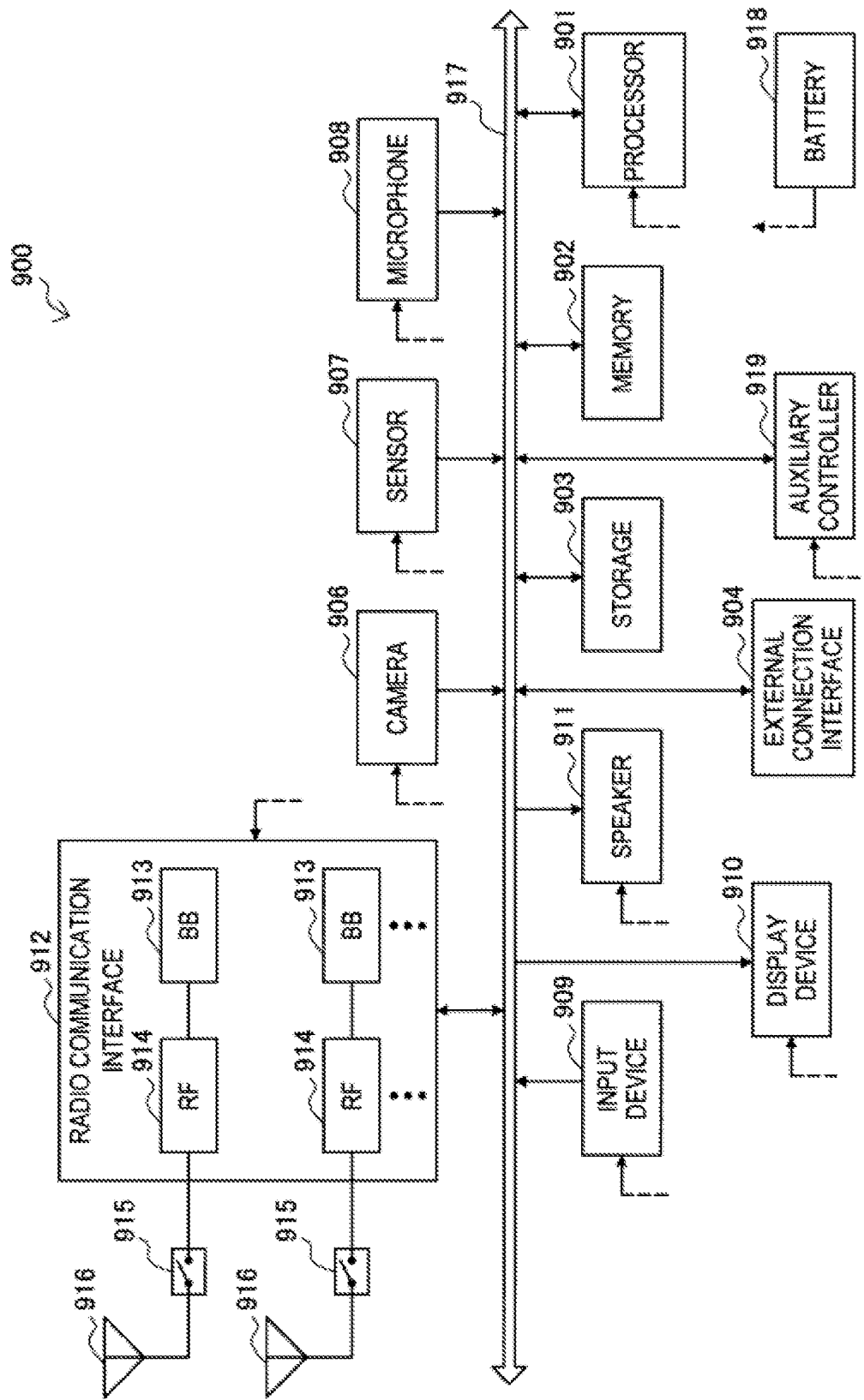
[Fig. 25]

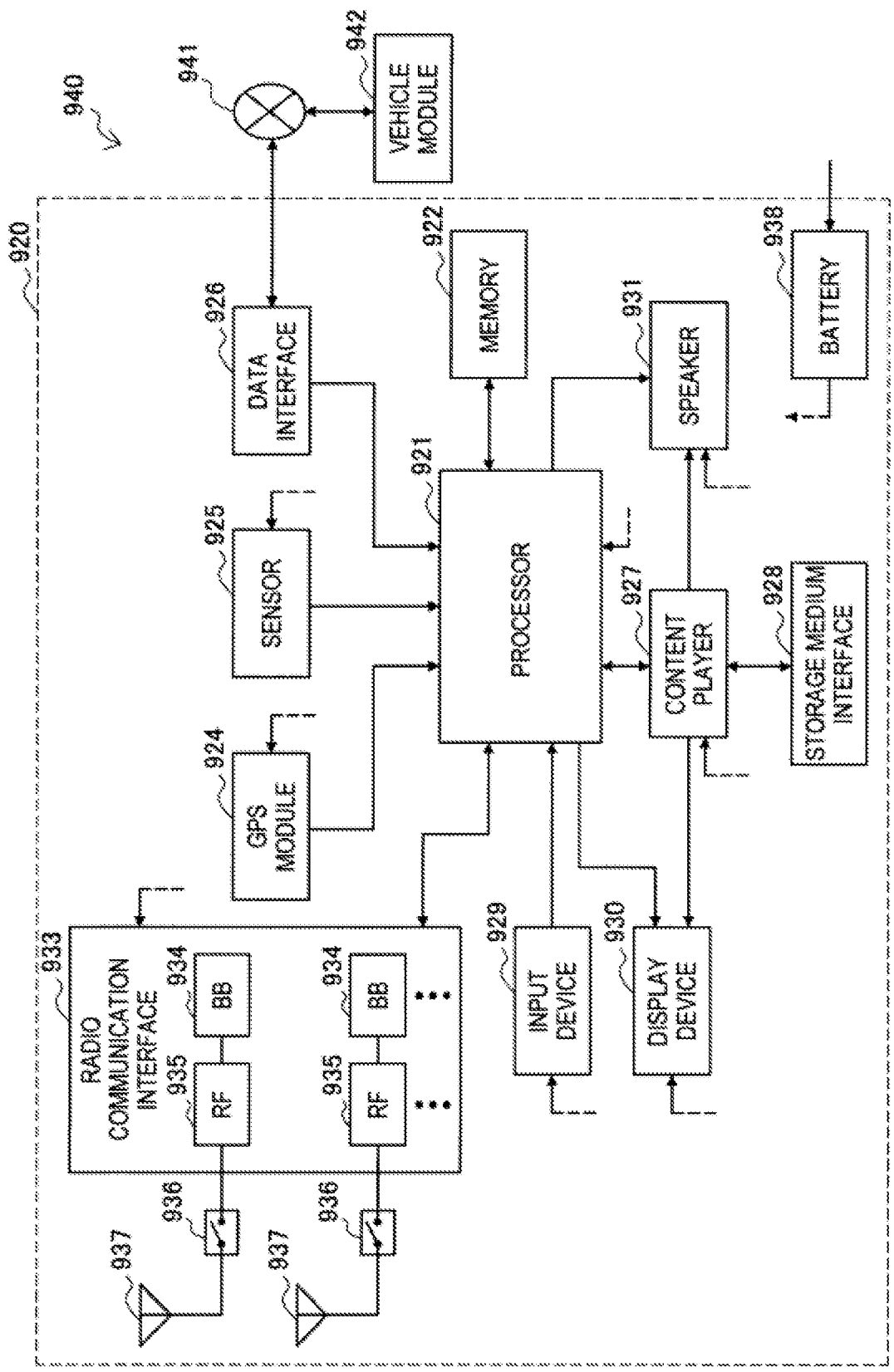
[Fig. 26]

DEVICE AND METHOD

CROSS REFERENCE TO RELATED APPLICATIONS

This application is a continuation of U.S. application Ser. No. 15/116,762 filed Aug. 4, 2016, which is a National Phase of PCT/JP2015/003567 filed Jul. 14, 2015 and claims the benefit of Japanese Priority Patent Application JP 2014-153812 filed Jul. 29, 2014, the entire contents of each of which are incorporated herein by reference.

TECHNICAL FIELD

The present disclosure relates to a device and a method.

BACKGROUND ART

Device-to-device communication (D2D communication) is communication in which two or more terminal devices transmit and receive signals directly, unlike typical cellular communication in which a base station and a terminal device transmit and receive signals. For this reason, it is anticipated that D2D communication will be used to create new usage scenarios for terminal devices that differ from the typical cellular communication above. For example, various applications are conceivable, such as information sharing by data communication between nearby terminal devices or among a group of nearby terminal devices, distribution of information from an installed terminal device, and autonomous communication between machines, called machine-to-machine (M2M) communication.

Additionally, it is conceivable that D2D communication will be put to effective use in data offloading in response to the significant increase in data traffic due to the recent increase in smartphones. For example, in recent years, there has been a sharp rise in the necessity to transmit and receive video image streaming data. However, since video images typically have large data sizes, there is a problem of consuming many resources on a radio access network (RAN). Consequently, if terminal devices are in a state suitable for D2D communication with each other, such as when the terminal devices are a short distance away from each other, video image data may be offloaded to D2D communication, thereby moderating the resource consumption and processing load on a RAN. In this way, D2D communication provides value to both telecommunications carriers and users. For this reason, D2D communication is currently recognized as one crucial technology area for Long Term Evolution (LTE), and is receiving attention from the 3rd Generation Partnership Project (3GPP) standards committee.

For example, Non Patent Literature 1 discloses a case in which D2D communication is performed in an uplink subframe within a network coverage area in the case of time division duplex (TDD).

CITATION LIST

Non Patent Literature

[NPL 1] 3GPP TR 36.843 V12.0.0 (March 2014)

SUMMARY

Technical Problem

For example, as radio resources available for D2D communication, periodic radio resources are allocated. For example, at periods of an integer multiple of a radio frame, radio resources of a specific subframe are allocated as the radio resources available for D2D communication. Therefore, D2D communication is performed in the specific subframe.

For example, when D2D communication is performed in a TDD carrier, radio resources of an uplink subframe of an uplink/downlink configuration (UL/DL configuration) of the TDD carrier are allocated as the radio resources available for D2D communication within a network coverage area. Therefore, D2D communication is performed in the uplink subframe.

However, when the UL/DL configuration of the TDD carrier is dynamically changed, the uplink subframe in which D2D communication is performed may be changed to a downlink subframe or a special subframe. As a result, D2D communication may be performed in the downlink subframe or the special subframe. That is, D2D communication that does not comply with cellular communication standards may be performed.

Accordingly, it is preferable to provide a mechanism in which a terminal device can appropriately perform D2D communication under a TDD environment.

Solution to Problem

According to an embodiment of the present disclosure, there is provided a device including: circuitry configured to dynamically change an uplink/downlink configuration of a time division duplex (TDD) carrier. The circuitry notifies a terminal device of a radio resource for device-to-device communication for the uplink/downlink configuration. The radio resource is a radio resource of at least one uplink subframe of the uplink/downlink configuration.

According to another embodiment of the present disclosure, there is provided a method including: dynamically changing, by a processor, an uplink/downlink configuration of a time division duplex (TDD) carrier; and notifying a terminal device of a radio resource for device-to-device communication for the uplink/downlink configuration. The radio resource is a radio resource of at least one uplink subframe of the uplink/downlink configuration.

According to another embodiment of the present disclosure, there is provided a device including: circuitry configured to acquire information indicating a radio resource for device-to-device communication for an uplink/downlink configuration of a TDD carrier that is dynamically changed by a base station; and the circuitry is further configured to control device-to-device communication using the radio resource. The radio resource is a radio resource of at least one uplink subframe of the uplink/downlink configuration.

According to another embodiment of the present disclosure, there is provided a method including: acquiring information indicating a radio resource for device-to-device communication for an uplink/downlink configuration of a time division duplex (TDD) carrier that is dynamically changed by a base station; and controlling, by a processor, device-to-device communication using the radio resource. The radio resource is a radio resource of at least one uplink subframe of the uplink/downlink configuration.

Advantageous Effects of Invention

According to one or more of embodiments of the present disclosure described above, a terminal device can appropriately perform D2D communication under a TDD environment, but the present disclosure is not necessarily limited to this effect. Along with or instead of this effect, any effect shown in this specification or other effects that may be understood from this specification may be achieved.

BRIEF DESCRIPTION OF DRAWINGS

FIG. 1 is a first explanatory diagram illustrating a specific example of a use case of D2D communication.

FIG. 2 is a second explanatory diagram illustrating a specific example of a use case of D2D communication.

FIG. 3 is an explanatory diagram illustrating exemplary timings of a PSS and an SSS in FDD.

FIG. 4 is an explanatory diagram illustrating exemplary timings of a PSS and an SSS in TDD.

FIG. 5 is an explanatory diagram illustrating a radio frame and subframes in a cellular system.

FIG. 6 is an explanatory diagram illustrating an exemplary resource pool.

FIG. 7 is an explanatory diagram illustrating an example of a signal and information transmitted in a resource pool.

FIG. 8 is an explanatory diagram illustrating a UL/DL configuration.

FIG. 9 is an explanatory diagram schematically illustrating an exemplary configuration of a communication system according to an embodiment of the present disclosure.

FIG. 10 is a block diagram illustrating an exemplary configuration of a base station according to the embodiment.

FIG. 11 is a block diagram illustrating an exemplary configuration of a terminal device according to the embodiment.

FIG. 12 is an explanatory diagram illustrating a first example of D2D resources.

FIG. 13 is an explanatory diagram illustrating a notification example of D2D resources according to a change of a UL/DL configuration.

FIG. 14 is an explanatory diagram illustrating a second example of D2D resources.

FIG. 15 is an explanatory diagram illustrating a third example of D2D resources.

FIG. 16 is an explanatory diagram illustrating a fourth example of D2D resources.

FIG. 17 is an explanatory diagram illustrating a fifth example of D2D resources.

FIG. 18 is an explanatory diagram illustrating a first example of a period for each configuration.

FIG. 19 is an explanatory diagram illustrating a second example of a period for each configuration.

FIG. 20 is a sequence diagram schematically illustrating a first example of a process flow according to the embodiment.

FIG. 21 is a sequence diagram schematically illustrating a second example of a process flow according to the embodiment.

FIG. 22 is a sequence diagram schematically illustrating a third example of a process flow according to the embodiment of the present disclosure.

FIG. 23 is a block diagram illustrating a first example of a schematic configuration of an eNB.

FIG. 24 is a block diagram illustrating a second example of a schematic configuration of an eNB.

FIG. 25 is a block diagram illustrating an example of a schematic configuration of a smartphone.

FIG. 26 is a block diagram illustrating an example of a schematic configuration of a car navigation device.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as terminal devices 10A, 10B, 10C, and so on as appropriate. On the other hand, when not particularly distinguishing each of multiple elements having substantially the same function and structure, only the same sign will be given. For example, the terminal devices 10A, 10B, 10C will be simply designated the terminal device 10 when not being particularly distinguished.

Hereinafter, the description will proceed in the following order.

1. Introduction
2. Technical problems according to embodiments of present disclosure
3. Schematic configuration of communication system
4. Configuration of respective devices
 4.1. Base station configuration
 4.2. Terminal device configuration
5. Technical features according to embodiments of present disclosure
 5.1. First technical features
 5.2. Second technical features
 5.3. Other technical features
6. Process flow
7. Applications
8. Conclusion «1. Introduction»

First, technology related to D2D communication will be described with reference to FIGS. 1 to 7.

(Use Case of D2D Communication)

In general LTE systems, an evolved Node B (eNB) and a user equipment (UE) perform radio communication, but UEs do not perform radio communication to each other. However, a method in which the UEs directly perform radio communication to each other is necessary for an application for public safety (for example, an application such as collision avoidance) or data offloading.

Use cases of D2D communication are discussed in 3GPP service and systems aspects (SA) 1 and the like, and are described in TR 22.803. Also, in TR 22.803, use cases are disclosed, but specific implementation methods are not disclosed. Hereinafter, specific examples of the use case will be described with reference to FIGS. 1 and 2.

FIG. 1 is a first explanatory diagram illustrating a specific example of a use case of D2D communication. Referring to FIG. 1, multiple UEs 10 and an eNB 20 are illustrated. As a first use case, for example, an UE 10A and an UE 10B positioned within a network coverage area (for example, inside a cell 21 of the eNB 20) perform D2D communication. Such D2D communication is referred to as in-coverage D2D communication. As a second use case, for example, an UE 10C and an UE 10D positioned outside of the network coverage area perform D2D communication. Such D2D communication is referred to as out-of-coverage D2D communication. As a third use case, for example, an UE 10E positioned within the network coverage area and an UE 10F positioned outside of the network coverage area perform D2D communication. Such D2D communication is referred to as partial-coverage D2D communication. From the viewpoint of public safety, out-of-coverage D2D communication and partial-coverage D2D communication are also important. Also, the network coverage area refers to a coverage area of a cellular network. That is, a set of cells builds the network coverage area.

FIG. 2 is a second explanatory diagram illustrating a specific example of a use case of D2D communication. Referring to FIG. 2, an UE 10A and an UE 10B, and an eNB 20A and an eNB 20B are illustrated. In this example, the eNB 20A is operated by a first mobile network operator (MNO) and the eNB 20B is operated by a second MNO. Then, the UE 10A positioned within a first network coverage area (for example, inside a cell 21A of the eNB 20A) and the UE 10B positioned within a second network coverage area (for example, inside a cell 21B of the eNB 20B) perform D2D communication. From the viewpoint of public safety, such D2D communication is also important.

(Flow Up to D2D Communication)

For example, synchronization, discovery, and connection establishment are sequentially performed, and then D2D communication is performed. Hereinafter, considerations of steps of synchronization, discovery, and connection establishment will be described.

(a) Synchronization

When two UEs are positioned within the network coverage area, the two UEs obtain synchronization with the eNB using a downlink signal from the eNB and thus are able to be synchronized to each other to some extent.

On the other hand, when at least one of two UEs attempting to perform D2D communication is positioned outside of the network coverage area, at least one of the two UEs is necessary to transmit a synchronization signal for synchronization in D2D communication.

(b) Discovery of other UEs

Discovery of other UEs is performed by, for example, transmitting and receiving a discovery signal. More specifically, for example, one UE of the two UEs transmits the discovery signal, and the other UE of the two UEs receives the discovery signal and attempts to communicate with the one UE.

The discovery signal is preferably transmitted at a predetermined timing in a time direction. Accordingly, it is possible to restrict a timing at which the UE of a reception side attempts to receive the discovery signal. Also, as the assumption, two UEs attempting to perform D2D communication may obtain synchronization in advance before the discovery signal is received.

(c) Connection Establishment

The two UEs attempting to perform D2D communication may establish a connection, for example, as follows. First, a first UE transmits a discovery signal and a second UE receives the discovery signal. Then, the second UE transmits a request message requesting connection establishment to the first UE. Then, the first UE transmits a completion message indicating completion of connection establishment to the second UE in response to the request message.

(Synchronization Signal Transmitted by eNB)

In LTE, the eNB transmits a primary synchronization signal (PSS) and a secondary synchronization signal (SSS) as a synchronization signal. The PSS and the SSS are transmitted at a predetermined timing in a frame structure of a radio frame. Hereinafter, a specific example of timings of the PSS and the SSS in frequency division duplex (FDD) and time division duplex (TDD) will be described with reference to FIGS. 3 and 4.

FIG. 3 is an explanatory diagram illustrating exemplary timings of a PSS and an SSS in FDD. Referring to FIG. 3, 10 subframes included in the radio frame are illustrated. In FDD, in subframes (that is, a first subframe and a sixth subframe) having subframe numbers 0 and 5, the PSS and the SSS are transmitted. More specifically, the SSS is transmitted in a sixth symbol of a first slot included in each of the subframes, and the PSS is transmitted in a seventh symbol of the first slot.

FIG. 4 is an explanatory diagram illustrating exemplary timings of a PSS and an SSS in TDD. Referring to FIG. 4, 10 subframes included in the radio frame are illustrated. In TDD, in subframes (that is, a second subframe and a seventh subframe) of subframe numbers 1 and 6, the PSS is transmitted. More specifically, in a third symbol of a first slot included in each subframe, the PSS is transmitted. In addition, in TDD, in subframes (that is, a first subframe and a sixth subframe) of subframe numbers 0 and 5, the SSS is transmitted. More specifically, in a seventh symbol of a second slot included in each subframe, the SSS is transmitted.

When the PSS is detected, the UE can recognize a timing of each subframe. In addition, when the SSS is detected, the UE can recognize which subframe is a subframe #0.

Furthermore, the UE can identify a cell group to which a cell formed by the eNB that transmits the PSS belongs among three cell groups based on a sequence of the PSS. In addition, the UE can identify a cell formed by the eNB that transmits the SSS among 168 cell candidates that belong to one cell group based on a sequence of the SSS. That is, the UE can identify a cell formed by the eNB that transmits the PSS and the SSS among 504 cell candidates based on the sequence of the PSS and the sequence of the SSS.

(Synchronization Signal of D2D Communication)

For example, when the UE is positioned within the network coverage area, synchronization for D2D communication is performed based on the synchronization signal transmitted by the eNB. For example, when the UE is positioned outside of the network coverage area, synchronization for D2D communication is performed based on the synchronization signal transmitted by another UE. Also, the synchronization signal may be a relayed signal.

The synchronization signal used by a terminal device for D2D communication may have various attributes. For example, the synchronization signal may have an attribute of a transmission source. The transmission source may be the eNB or the UE. For example, the synchronization signal may have an attribute of presence or absence of relay.

When the synchronization signal is wirelessly relayed, deterioration of precision of a center frequency is concerned. Accordingly, it is preferable that the number of relays (the number of hops) be smaller.

The eNB is more preferable than the UE as the transmission source of the synchronization signal. This is because precision of an oscillator of the eNB is higher than precision of an oscillator of the UE.

(Radio Resources Available for D2D Communication)

(a) Resource Pool

As radio resources available for D2D communication, radio resources called a resource pool are prepared. As the resource pool, periodic radio resources are considered. For example, the resource pool is represented by a period and an offset (in a time direction).

As a method of using the resource pool, two methods may be provided. In the first method, a management node (for example, the eNB or the UE) allocates radio resources among the resource pool to the UE and notifies the UE of the radio resources. The UE can perform D2D communication in the allocated radio resources. In the second method, the UE selects radio resources from among the resource pool, and performs D2D communication in the radio resources. The first method is a non-contention-based method and there is no collision. On the other hand, the second method is a contention-based method, and collision may occur.

(b) Multiple Resource Pools

It is considered natural that multiple resource pools are prepared. In this case, the period and the offset of the resource pool may be different from periods and offsets of other resource pools. Also, the period of the resource pool may be the same as periods of other resource pools while the offset of the resource pool is different from offsets of the other resource pools.

Hereinafter, the radio frame and the subframe serving as a unit of time in a cellular system will be described with reference to FIG. 5. A specific example of the resource pool will be described with reference to FIG. 6.

FIG. 5 is an explanatory diagram illustrating a radio frame and subframes in a cellular system. Referring to FIG. 5, the radio frame and 10 subframes included in one radio frame are illustrated. Each radio frame is 10 ms, and each subframe is 1 ms. Each radio frame has a system frame number (SFN) of any of 0 to 1023, and 1024 radio frames are repeatedly presented.

FIG. 6 is an explanatory diagram illustrating an exemplary resource pool. Referring to FIG. 6, two resource pools (that is, a resource pool #1 and a resource pool #2) are illustrated. The radio resources available for D2D communication are considered to be periodically arranged in the subframe. For example, the resource pool #1 includes radio resources of subframes 31 that are repeated at a period 33, and the resource pool #2 includes radio resources of subframes 35 that are repeated at a period 37. For example, the period 33 is 200 ms, and the period 37 is 400 ms. Also, in this example, the resource pool #1 and the resource pool #2 have different offsets.

(c) Signal/Information Transmitted in Resource Pool

For example, in the resource pool, a synchronization signal and synchronization information (information of synchronization) are transmitted by a representative UE. In addition, the UE performs D2D communication in radio resources other than the radio resources in which the synchronization signal and the synchronization information are transmitted among the resource pool. Hereinafter, a specific example thereof will be described with reference to FIG. 7.

FIG. 7 is an explanatory diagram illustrating an example of a signal and information transmitted in a resource pool. Referring to FIG. 7, N resource pools (that is, resource pools #1 to #N) are illustrated. In each of the N resource pools, the synchronization signal and the synchronization information are transmitted. In addition, in each of the N resource pools, D2D communication may be performed in radio resources other than the radio resources in which the synchronization signal and the information are transmitted. Also, one UE may transmit the synchronization signal and the synchronization information in two or more resource pools.

«2. Technical Problems According to Embodiments of Present Disclosure»

First, technical problems according to embodiments of the present disclosure will be described with reference to FIG. 8.

(Premises)

For example, as radio resources available for D2D communication, periodic radio resources are allocated. For example, at periods of an integer multiple of a radio frame, radio resources of a specific subframe are allocated as the radio resources available for D2D communication. Therefore, D2D communication is performed in the specific subframe.

For example, when D2D communication is performed in a TDD carrier, radio resources of an uplink subframe of a UL/DL configuration of the TDD carrier are allocated as the radio resources available for D2D communication within a network coverage area. Therefore, D2D communication is performed in the uplink subframe. A specific example thereof will be described below with reference to FIG. 8.

FIG. 8 is an explanatory diagram illustrating a UL/DL configuration. Referring to FIG. 8, seven configurations (configurations 0 to 6) that may be selected as the UL/DL configuration of the TDD carrier are illustrated. In each of the configurations, each of 10 subframes included in a radio frame is determined as a downlink subframe, an uplink subframe or a special subframe. As an example, when the UL/DL configuration of the TDD carrier is the configuration 2, radio resources of any of subframes having subframe numbers 2 and 7 are allocated as the radio resources available for D2D communication. As another example, when the UL/DL configuration of the TDD carrier is the configuration 3, radio resources of any of subframes having subframe numbers 2, 3, and 4 are allocated as the radio resources available for D2D communication.

(First Technical Problem)

In the case of in-coverage, the base station may notify the terminal device of the radio resources available for D2D communication. However, when the base station freely selects the radio resources available for D2D communication without constraints, the base station may use many radio resources in order to notify the radio resources available for D2D communication. As a result, from the viewpoint of the radio resources, a load on the base station may become large.

Referring again to FIG. 8, for example, when the UL/DL configuration of the TDD carrier is the configuration 2, radio resources of a subframe having a subframe number 7 are allocated as the radio resources available for D2D communication. Then, the UL/DL configuration is changed from the configuration 2 to the configuration 3. Therefore, the subframe having a subframe number 7 becomes the downlink subframe. As a result, D2D communication may be performed in the downlink subframe.

Accordingly, it is preferable to provide a mechanism in which the terminal device can appropriately perform D2D communication under a TDD environment. More specifically, for example, it is preferable to provide a mechanism in which the terminal device can continuously perform D2D communication in the uplink subframe under the TDD environment.

(Second Technical Problem)

In addition, when radio resources of the uplink subframe of the UL/DL configuration of the TDD carrier are freely allocated as the radio resources available for D2D communication, a negative influence may occur in TDD radio communication between the base station and the terminal device.

For example, when the uplink subframe is allocated for D2D communication, the terminal device transmits no uplink signal in the uplink subframe. Therefore, for example, communication quality in an uplink of the terminal device may decrease. As an example, when a user of the terminal device makes a call, a transmission interval of audio data by the terminal device may be longer. Therefore, a delay may occur when audio data is transmitted. As a result, communication quality may decrease. As another example, transmission of ACK/NACK (that is, ACK/NACK of downlink data) by the terminal device in an uplink at an appropriate timing is considered to be difficult. Specifically, errors or delays are considered to occur when ACK/NACK is transmitted in the uplink.

Accordingly, it is preferable to provide a mechanism in which the terminal device can appropriately perform D2D communication under the TDD environment. More specifically, for example, it is preferable to provide a mechanism in which a negative influence occurring in TDD radio communication between the base station and the terminal device due to D2D communication can be reduced.

«2. Schematic Configuration of Communication System»

Next, a schematic configuration of a communication system 1 according to an embodiment of the present disclosure will be described with reference to FIG. 9. FIG. 9 is an explanatory diagram illustrating an example of a schematic configuration of the communication system 1 according to the embodiment of the present disclosure. Referring to FIG. 9, the communication system 1 includes a base station 100 and a terminal device 200. The communication system 1 is, for example, a cellular system, and is a system compliant with, for example, LTE, LTE-Advanced, or communication standards conforming thereto.

(The Base Station 100)

The base station 100 performs radio communication with the terminal device. For example, the base station 100 performs radio communication with the terminal device 200 which is positioned inside a cell 101 of the base station 100.

Especially, in the embodiment of the present disclosure, the base station 100 performs radio communication in TDD. Specifically, for example, the base station 100 uses the TDD carrier, transmits a downlink signal in the downlink subframe, and receives an uplink signal in the uplink subframe. The TDD carrier is a carrier for TDD radio communication, for example, a component carrier.

Also, in FIG. 9, only one base station (that is, the base station 100) included in the communication system 1 is illustrated. It is needless to say that the communication system 1 may include multiple base stations. Then, a set of multiple base stations builds the network coverage area (that is, a coverage area of the cellular network).

(The Terminal Device 200)

The terminal device 200 performs radio communication with the base station. For example, when the terminal device 200 is positioned inside the cell 101 of the base station 100, the terminal device 200 performs radio communication with the base station 100. For example, the terminal device 200 performs radio communication with the base station in TDD. Specifically, for example, the terminal device 200 uses the TDD carrier, receives a downlink signal in the downlink subframe, and transmits an uplink signal in the uplink subframe.

Especially, in the embodiment of the present disclosure, the terminal device 200 performs D2D communication. For example, the terminal device 200 performs D2D communication with another terminal device 200.

«4. Configuration of Respective Devices»

Next, exemplary configurations of the base station 100 and the terminal device 200 will be described with reference to FIGS. 10 to 11.

<4.1. Base Station Configuration»

FIG. 10 is a block diagram illustrating an exemplary configuration of the base station 100 according to the embodiment of the present disclosure. Referring to FIG. 10, the base station 100 includes an antenna unit 110, a radio communication unit 120, a network communication unit 130, a storage unit 140 and a processing unit 150.

(The Antenna Unit 110)

The antenna unit 110 receives a radio signal and outputs the received radio signal to the radio communication unit 120. In addition, the antenna unit 110 transmits a transmission signal output by the radio communication unit 120.

(The Radio Communication Unit 120)

The radio communication unit 120 transmits and receives a signal. For example, the radio communication unit 120 transmits a downlink signal to the terminal device and receives an uplink signal from the terminal device.

(The Network Communication Unit 130)

The network communication unit 130 transmits and receives information. For example, the network communication unit 130 transmits information to other nodes and receives information from other nodes. For example, the other nodes include other base stations and a core network node.

(The Storage Unit 140)

The storage unit 140 stores a program and data for operating the base station 100.

(The Processing Unit 150)

The processing unit 150 provides various functions of the base station 100. The processing unit 150 includes an information acquisition unit 151 and a control unit 153. Also, the processing unit 150 may further include a component other than these components. That is, the processing unit 150 may also perform an operation other than operations of these components.

Operations of the information acquisition unit 151 and the control unit 153 will be described later in detail.

<4.2. Terminal Device Configuration»

FIG. 11 is a block diagram illustrating an exemplary configuration of the terminal device 200 according to the embodiment of the present disclosure. Referring to FIG. 11, the terminal device 200 includes an antenna unit 210, a radio communication unit 220, a storage unit 230 and a processing unit 240.

(The Antenna Unit 210)

The antenna unit 210 receives a radio signal and outputs the received radio signal to the radio communication unit 220. In addition, the antenna unit 210 transmits a transmission signal output by the radio communication unit 220.

(The Radio Communication Unit 220)

The radio communication unit 220 transmits and receives a signal. For example, the radio communication unit 220 receives a downlink signal from the base station and transmits an uplink signal to the base station. In addition, for example, the radio communication unit 220 receives a signal from another terminal device and transmits a signal to another terminal device.

(The Storage Unit 230)

The storage unit 230 stores a program and data for operating the terminal device 200.

(The Processing Unit 240)

The processing unit 240 provides various functions of the terminal device 200. The processing unit 240 includes an information acquisition unit 241 and a control unit 243. Also, the processing unit 240 may further include a component other than these components. That is, the processing unit 240 may also perform an operation other than operations of these components.

Operations of the information acquisition unit 241 and the control unit 243 will be described later in detail.

«5. Technical Features According to Embodiments of Present Disclosure»

Figure 12:
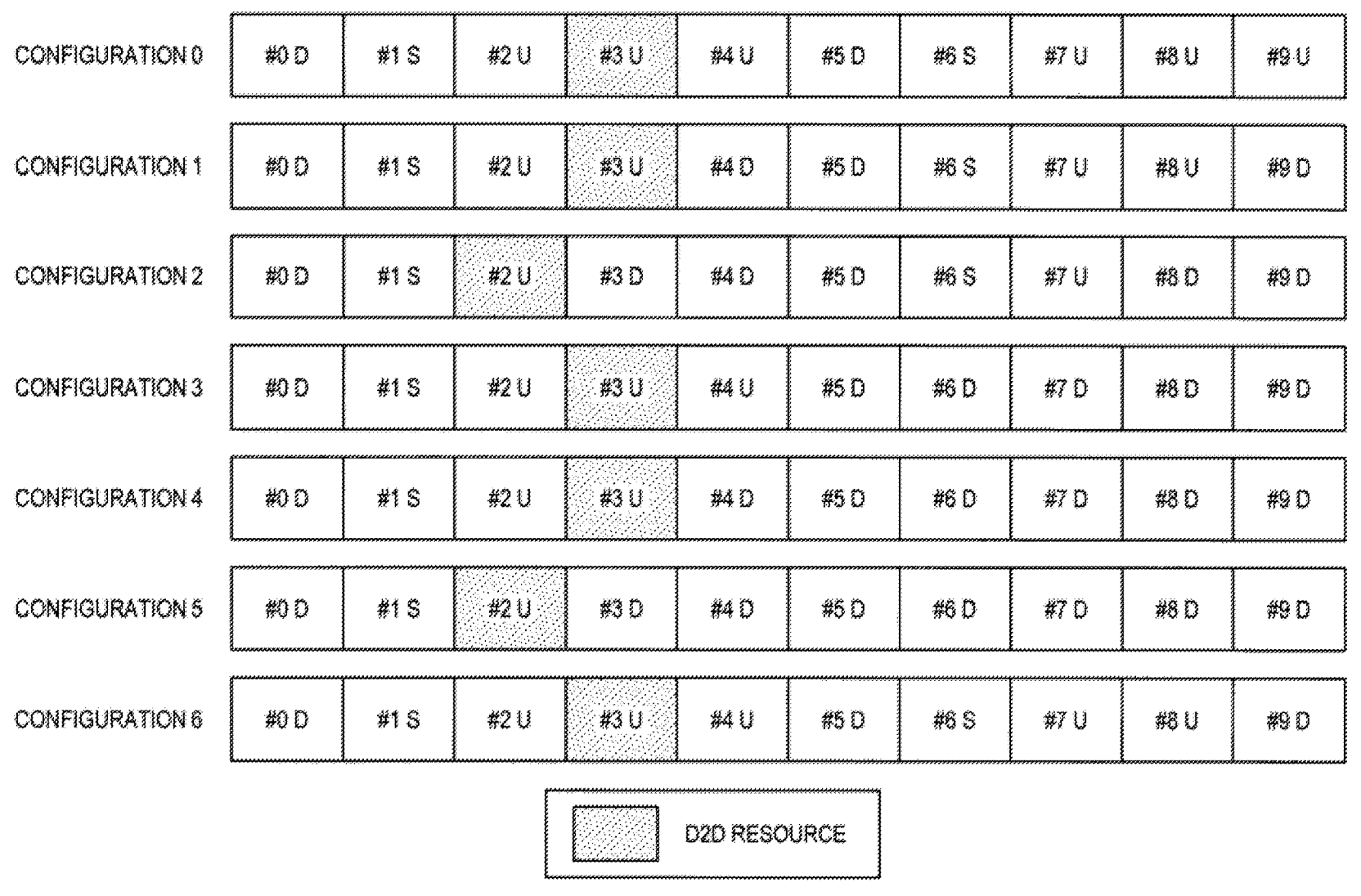

Next, technical features according to embodiments of the present disclosure will be described with reference to FIGS. 12 to 19.

<5.1. First Technical Features>

First, the first technical features according to the embodiment of the present disclosure will be described with reference to FIGS. 12 to 15. The first technical features are, for example, features that correspond to the first technical problem according to the embodiment of the present disclosure described above.

(Dynamic Change of UL/DL Configuration)

The base station 100 (the control unit 153) dynamically changes the UL/DL configuration of the TDD carrier.

(a) Multiple Configurations

For example, the base station 100 (the control unit 153) changes the UL/DL configuration from one configuration among multiple configurations to another configuration among the multiple configurations.

For example, the multiple configurations include seven configurations (configurations 0 to 6) illustrated in FIG. 8. That is, the base station 100 (the control unit 153) changes the UL/DL configuration from one configuration among the seven configurations to another configuration.

As a specific process, for example, the control unit 153 changes the UL/DL configuration by changing an operation parameter designating the UL/DL configuration. Also, this is only an example of a specific process, and it is needless to say that the control unit 153 may perform another process according to mounting.

(b) Notification of UL/DL Configuration

For example, the base station 100 (the control unit 153) notifies the terminal device of the UL/DL configuration of the TDD carrier.

(b-1) Notification Method

Reporting System Information

For example, the base station 100 (the control unit 153) notifies the terminal device of the UL/DL configuration by reporting system information indicating the UL/DL configuration. For example, the system information is a system information block (SIB) 1.

Accordingly, for example, not only the terminal device in a connection mode but also the terminal device in an idle mode can recognize the UL/DL configuration.

Separate Signaling

The base station 100 (the control unit 153) may notify the terminal device in a connection mode of the UL/DL configuration using separate signaling in addition to reporting the system information. The separate signaling may be radio resource control (RRC) signaling. The terminal device in a connection mode may be, for example, the terminal device 200.

Accordingly, for example, it is possible to notify of a change in the UL/DL configuration quickly.

(b-2) Operation of the Terminal Device 200

For example, the terminal device 200 (the information acquisition unit 241) acquires the UL/DL configuration. Therefore, the terminal device 200 (the control unit 243) performs radio communication with the base station using the TDD carrier according to the UL/DL configuration.

(Notification of Radio Resources for D2D Communication)

The base station 100 (the control unit 153) notifies the terminal device of the radio resources for D2D communication appropriate for the UL/DL configuration. The radio resources are radio resources of the TDD carrier. Also, "radio resources for D2D communication" may be simply referred to as "D2D resources" below.

On the other hand, the terminal device 200 (the information acquisition unit 241) acquires information indicating the D2D resources appropriate for the UL/DL configuration (that is, the UL/DL configuration of the TDD carrier that is dynamically changed by the base station 100). Therefore, the terminal device 200 performs D2D communication using the D2D resources. The control unit 243 of the terminal device 200 controls D2D communication using the D2D resources.

(a) D2D Resources Appropriate for UL/DL Configuration

The D2D resources appropriate for the UL/DL configuration are radio resources of at least one uplink subframe of the UL/DL configuration.

Referring again to FIG. 8, as an example, when the UL/DL configuration is the configuration 1, the D2D resources appropriate for the UL/DL configuration are radio resources of at least one subframe among subframes having subframe numbers 2, 3, 7, and 8. As another example, when the UL/DL configuration is the configuration 4, the D2D resources appropriate for the UL/DL configuration are radio resources of at least one subframe among subframes having subframe numbers 2 and 3.

Also, for example, the D2D resources are periodic radio resources. More specifically, for example, the D2D resources are radio resources that are repeated at periods of an integer multiple of a radio frame. In this case, as long as the period is not one radio frame, the D2D resources are radio resources of a specific subframe of a limited radio frame. The D2D resources may be referred to as a resource pool. Multiple resource pools each having a period (and an offset) may be prepared. The D2D resources may be indicated by a period (and an offset) of a radio frame and a subframe.

(b) Notification Method

For example, the base station 100 (the control unit 153) notifies the terminal device of the D2D resources by reporting system information indicating the D2D resources appropriate for the UL/DL configuration. Accordingly, for example, not only the terminal device in a connection mode but also the terminal device in an idle mode can recognize the D2D resources.

Also, the base station 100 (the control unit 153) may notify the terminal device 200 of the D2D resources using separate signaling. The separate signaling may be RRC signaling.

(c) Notification Form (c-1) Notification of D2D Resources According to Change of the UL/DL Configuration As described above, the base station 100 (the control unit 153) changes the UL/DL configuration from one configuration among the multiple configurations to another configuration among the multiple configurations.

As a first notification form, for example, the base station 100 (the control unit 153) notifies the terminal device of the D2D resources appropriate for the other configuration according to a change of the UL/DL configuration. The D2D resources appropriate for the other configuration are radio resources of at least one uplink subframe of the other configuration.

On the other hand, the terminal device 200 (the information acquisition unit 241) acquires information indicating the D2D resources of which the base station 100 has notified the terminal device 200. Therefore, the terminal device 200 uses the D2D resources of which the base station 100 has notified the terminal device 200, and performs D2D communication.

That is, the control unit 243 of the terminal device 200 controls D2D communication using the D2D resources of which the base station 100 has notified the terminal device 200.

A specific example of the D2D resources of which the base station 100 has notified the terminal device will be described below with reference to FIGS. 12 and 13.

FIG. 12 is an explanatory diagram illustrating a first example of D2D resources. Referring to FIG. 12, configurations 0 to 6 are illustrated. In this example, one uplink subframe is prepared as the D2D resources for each configuration. For example, the D2D resources appropriate for each of the configurations 0, 1, 3, 4 and 6 are radio resources of an uplink subframe having a subframe number 3. In addition, for example, the D2D resources appropriate for each of the configurations 2 and 5 are radio resources of an uplink subframe having a subframe number 2.

FIG. 13 is an explanatory diagram illustrating a notification example of the D2D resources according to the change of the UL/DL configuration. Referring to FIG. 13, for example, the UL/DL configuration of the TDD carrier is changed from the configuration 0 to the configuration 2. The D2D resources appropriate for the configuration 0 are radio resources of a subframe having a subframe number 3. The D2D resources appropriate for the configuration 2 are radio resources of a subframe having a subframe number 2. In this case, the base station 100 (the control unit 153) notifies the terminal device of radio resources of an uplink subframe having a subframe number 2 as the D2D resources according to the change of the UL/DL configuration. As a result, the terminal device 200 does not perform D2D communication in a subframe having a subframe number 3 after the change of the UL/DL configuration, but performs D2D communication in a subframe having a subframe number 2.

In this manner, for example, when the UL/DL configuration is changed to any of the configurations 0, 1, 3, 4 and 6, the base station 100 (the control unit 153) notifies the terminal device of radio resources of an uplink subframe having a subframe number 3 as the D2D resources. In addition, for example, when the UL/DL configuration is changed to any of the configurations 2 and 5, the base station 100 (the control unit 153) notifies the terminal device of radio resources of an uplink subframe having a subframe number 2 as the D2D resources.

Also, in the example of FIG. 12, the D2D resources are radio resources of one subframe within a radio frame. However, it is needless to say that the D2D resources may be radio resources of two or more subframes within a radio frame.

In addition, for example, the D2D resources are periodic radio resources and have a period (and an offset). In this case, for example, the base station 100 (the control unit 153) notifies of not only the subframe but also the period (and the offset) when the D2D resources are notified of. For example, the period is a period of an integer multiple of a radio frame.

As described above, for example, the base station 100 (the control unit 153) notifies the terminal device of the D2D resources appropriate for the other configuration (that is, the changed configuration) according to the change of the UL/DL configuration. Accordingly, for example, the terminal device can continuously perform D2D communication in the uplink subframe under the TDD environment. That is, even when a UL/DL subframe of the TDD carrier is changed, the base station 100 notifies the terminal device 200 of the D2D resources (the radio resources of the uplink subframe) appropriate for the changed configuration, and the terminal device 200 can perform D2D communication in the uplink subframe.

Also, for example, the base station 100 reports system information indicating the other configuration (that is, the changed configuration) from immediately before the change of the UL/DL configuration to immediately before the following change of the UL/DL configuration. The base station 100 may notify the terminal device 200 of the other configuration (that is, the changed configuration) using separate signaling immediately before the change of the UL/DL configuration.

(c-2) Notification of D2D Resources Appropriate for Each of the Multiple Configurations As described above, the base station 100 (the control unit 153) changes the UL/DL configuration from one configuration among the multiple configurations to another configuration among the multiple configurations.

As a second notification form, for example, the base station 100 (the control unit 153) notifies the terminal device of the D2D resources appropriate for each of the multiple configurations.

FIRST EXAMPLE

D2D Resources for Each Configuration

As a first example, the radio resources appropriate for each of the multiple configurations include the D2D resources for each configuration. That is, the base station 100 (the control unit 153) notifies the terminal device of the D2D resources for each configuration included in the multiple configurations.

Referring again to FIG. 12, for example, the multiple configurations are the configurations 0 to 6. The D2D resources for each configuration are illustrated. For example, the base station 100 (the control unit 153) notifies the terminal device of the D2D resources for each of these configurations.

On the other hand, the terminal device 200 (the information acquisition unit 241) acquires information indicating the D2D resources appropriate for the UL/DL configuration among the D2D resources appropriate for each of the multiple configurations based on the UL/DL configuration of which the base station 100 has notified the terminal device. Therefore, the terminal device 200 performs D2D communication using the D2D resources.

Referring again to FIG. 13, for example, the UL/DL configuration of the TDD carrier is changed from the configuration 0 to the configuration 2. In this case, the base station 100 notifies the terminal device of the configuration 2, and the terminal device 200 (the information acquisition unit 241) acquires information indicating the D2D resources appropriate for the configuration 2 among the D2D resources appropriate for each of the configurations 0 to 6. Therefore, the terminal device 200 performs D2D communication in the D2D resources appropriate for the configuration 2.

In addition, for example, the D2D resources are periodic radio resources and have a period (and an offset). In this case, for example, the base station 100 (the control unit 153) notifies of not only the subframe but also the period (and the offset) when the D2D resources are notified of. For example, the period is a period of an integer multiple of a radio frame.

As described above, the base station 100 (the control unit 153) notifies the terminal device of the D2D resources for each configuration included in the multiple configurations.

Accordingly, for example, the terminal device can continuously perform D2D communication in the uplink subframe under the TDD environment. That is, even when the UL/DL subframe of the TDD carrier is changed, the terminal device 200 can specify the D2D resources (the radio resources of the uplink subframe) appropriate for the changed configuration, and perform D2D communication in the uplink subframe.

SECOND EXAMPLE

D2D Resources Common Among Multiple Configurations

As a second example, the radio resources appropriate for each of the multiple configurations may be radio resources of at least one uplink subframe common among the multiple configurations. That is, the base station 100 (the control unit 153) may notify the terminal device of radio resources of at least one uplink subframe common among the multiple configurations as the D2D resources.

On the other hand, the terminal device 200 (the information acquisition unit 241) may acquire information indicating the D2D resources (that is, radio resources of at least one uplink subframe common among the multiple configurations) of which the base station 100 has notified the terminal device. Therefore, the terminal device 200 may use the D2D resources of which the base station 100 has notified the terminal device 200 and perform D2D communication. That is, the control unit 243 of the terminal device 200 may control D2D communication using the D2D resources of which the base station 100 has notified the terminal device 200.

A specific example of the D2D resources will be described below with reference to FIG. 14.

Figure 14:
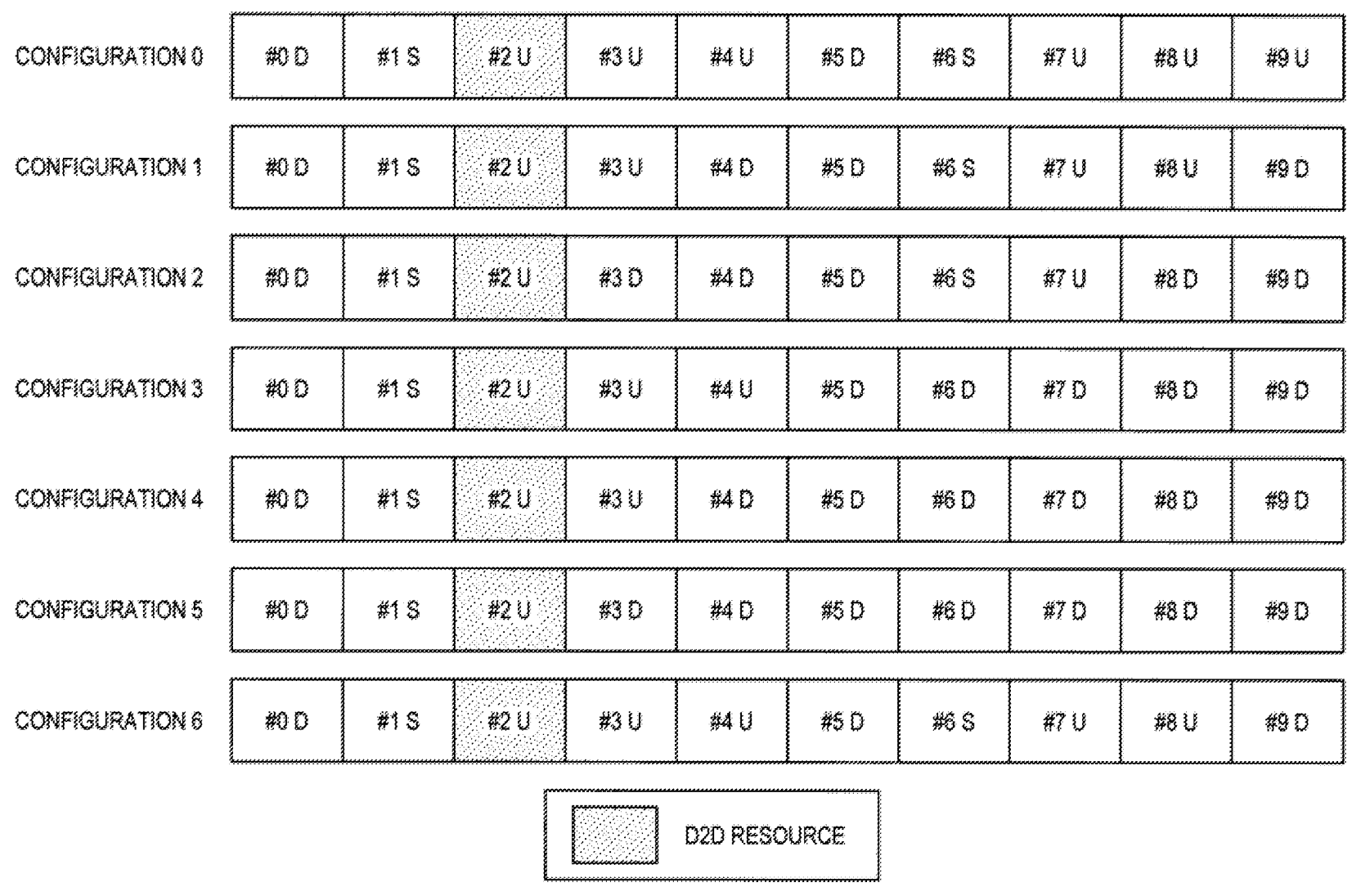

FIG. 14 is an explanatory diagram illustrating a second example of the D2D resources. Referring to FIG. 14, configurations 0 to 6 are illustrated. In this example, radio resources of an uplink subframe (that is, a subframe having a subframe number 2) common among the configurations 0 to 6 are prepared as the D2D resources. In this case, the base station 100 notifies the terminal device of radio resources of an uplink subframe having a subframe number 2 as the D2D resources. Accordingly, either before the change or after the change of the UL/DL subframe of the TDD carrier, the terminal device 200 can perform D2D communication in the uplink subframe having the subframe number 2.

While the example in which a subframe common among the multiple configurations is a subframe having a subframe number 2 has been described, the subframe common among the multiple configurations is not limited thereto. For example, the multiple configurations may not be seven configurations (that is, the configurations 0 to 6), but may be some of the seven configurations. Therefore, the subframe common among the multiple configurations may be a subframe other than the subframe having a subframe number 2. A specific example thereof will be described below with reference to FIG. 15.

Figure 15:
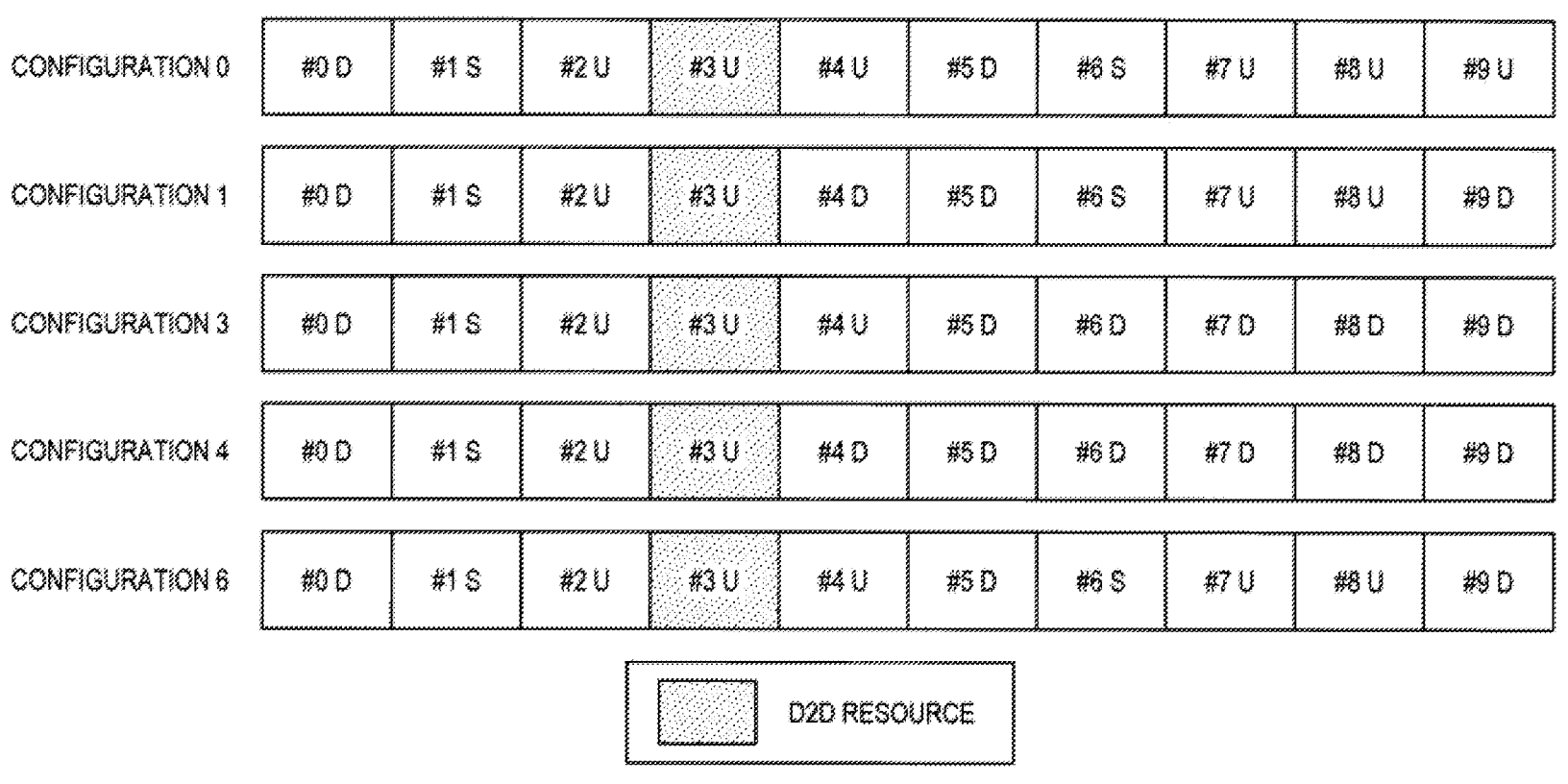

FIG. 15 is an explanatory diagram illustrating a third example of the D2D resources. Referring to FIG. 15, the configurations 0, 1, 3, 4 and 6 are illustrated. In this example, the multiple configurations are the configurations 0, 1, 3, 4 and 6. Therefore, radio resources of an uplink subframe (for example, a subframe having a subframe number 3) common among the configurations 0, 1, 3, 4 and 6 are prepared as the D2D resources. In this case, the base station 100 notifies the terminal device of radio resources of an uplink subframe having a subframe number 3 as the D2D resources. Accordingly, either before the change or after the change of the UL/DL subframe of the TDD carrier, the terminal device 200 can perform D2D communication in the uplink subframe having the subframe number 3.

In addition, for example, the D2D resources are periodic radio resources and have a period (and an offset). In this case, for example, the base station 100 (the control unit 153) notifies of not only the subframe but also the period (and the offset) when the D2D resources are notified of. For example, the period is a period of an integer multiple of a radio frame.

As described above, the base station 100 (the control unit 153) may notify the terminal device of radio resources of at least one uplink subframe common among the multiple configurations as the D2D resources. Accordingly, for example, the terminal device can continuously perform D2D communication in the uplink subframe under the TDD environment. That is, either before the change or after the change of the UL/DL subframe of the TDD carrier, the terminal device 200 can perform D2D communication in the uplink subframe.

Also, for example, a period (and an offset) of the D2D resources may be common among the multiple configurations. That is, the D2D resources common among the multiple configurations may also be prepared. Accordingly, for example, regardless of the change of UL/DL configuration, the terminal device can perform D2D communication in the D2D resources.

As described above, the base station 100 (the control unit 153) notifies the terminal device of the D2D resources appropriate for the UL/DL configuration. Also, for example, the D2D resources refer to a resource pool having a period (and an offset), and the base station 100 (the control unit 153) may notify the terminal device of the resource pool (the D2D resources) appropriate for the UL/DL configuration in each of multiple resource pools.

<5.1. Second Technical Features>

Next, the second technical features according to the embodiment of the present disclosure will be described with reference to FIGS. 16 to 19. The second technical features are, for example, features that correspond to the second technical problem according to the embodiment of the present disclosure described above.

(D2D Resources Appropriate for UL/DL Configuration)

As described above, the base station 100 (the control unit 153) notifies the terminal device of the radio resources for D2D communication appropriate for the UL/DL configuration (the D2D resources). In addition, the D2D resources appropriate for the UL/DL configuration are the radio resources of at least one uplink subframe of the UL/DL configuration.

(a) Features of Subframe (a-1) Some of Two or More Successive Uplink Subframes

For example, each of the at least one uplink subframe is included in two or more successive uplink subframes of the UL/DL configuration. That is, the D2D resources appropriate for the UL/DL configuration are radio resources of at least one uplink subframe included in each of the two or more successive uplink subframes of the UL/DL configuration. Also, one or more uplink subframes among the two or more successive uplink subframes are not included in the at least one uplink subframe. A specific example of the D2D resources will be described below with reference to FIG. 16.

Figure 16:
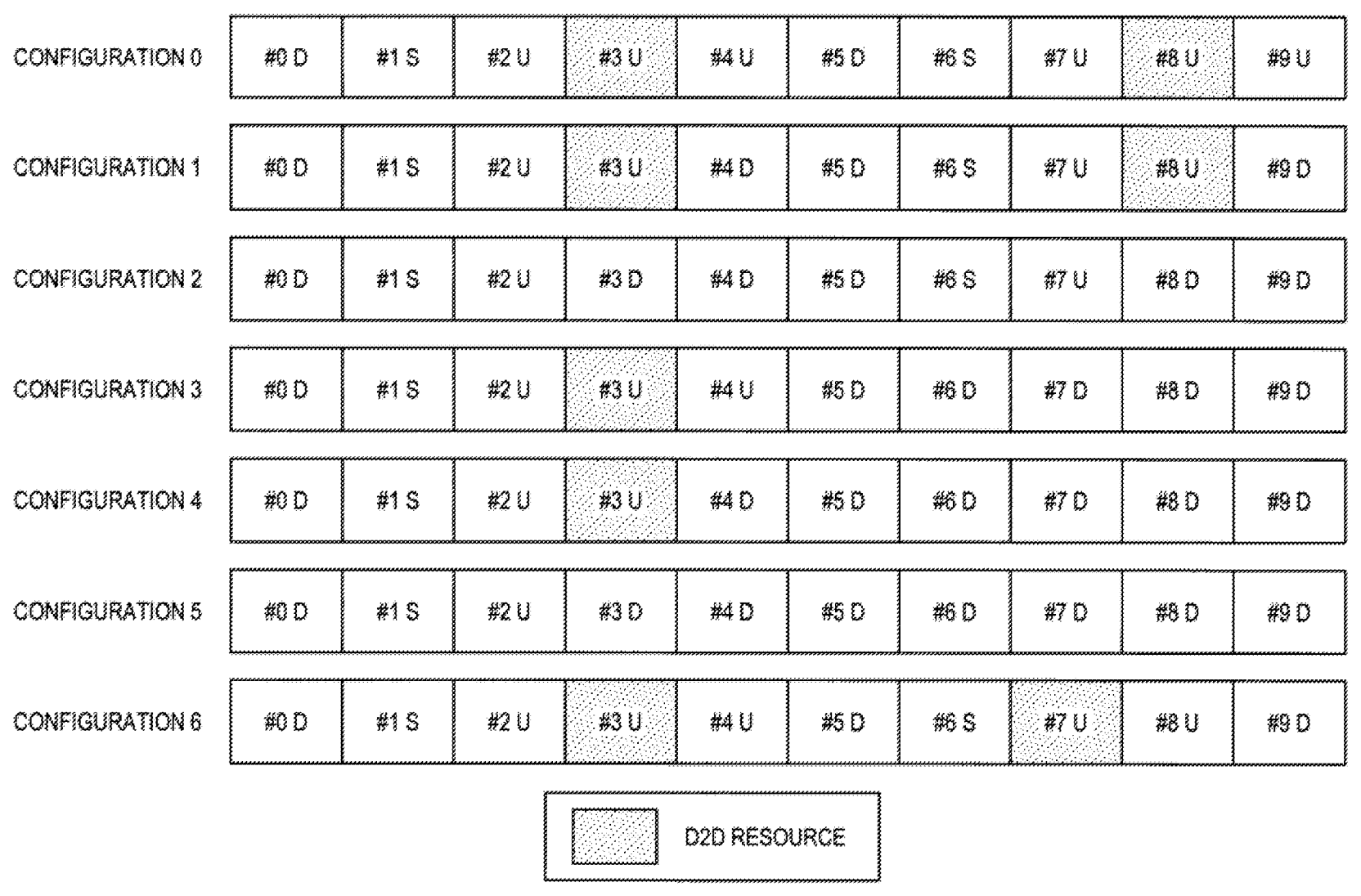

FIG. 16 is an explanatory diagram illustrating a fourth example of the D2D resources. Referring to FIG. 16, configurations 0 to 6 are illustrated. For example, the D2D resources appropriate for the configuration 0 are radio resources of subframes having subframe numbers 3 and 8. In the configuration 0, a subframe having a subframe number 3 is included in three successive uplink subframes, and a subframe having a subframe number 8 is also included in three successive uplink subframes. The D2D resources appropriate for the configuration 1 are radio resources of subframes having subframe numbers 3 and 8. The D2D resources appropriate for the configurations 3 and 4 are radio resources of a subframe having a subframe number 3. The D2D resources appropriate for the configuration 6 are radio resources of subframes having subframe numbers 3 and 7.

Accordingly, for example, it is possible to decrease a negative influence occurring in TDD radio communication between the base station and the terminal device due to D2D communication. More specifically, for example, even when the uplink subframe is unable to be used in TDD radio communication due to D2D communication, a maximum interval between the uplink subframes used in TDD radio communication hardly becomes longer. Therefore, a decrease in uplink communication quality due to an increase in the interval of the uplink subframe is suppressed.

Limitation of D2D Communication

For example, when the UL/DL configuration includes two or more successive uplink subframes, the base station 100 (the control unit 153) notifies the terminal device of the D2D resources appropriate for the UL/DL configuration. On the other hand, when the UL/DL configuration does not include two or more successive uplink subframes, the base station 100 (the control unit 153) does not notify the terminal device of the D2D resources appropriate for the UL/DL configuration.

That is, when the UL/DL configuration includes two or more successive uplink subframes, D2D communication is performed, and when the UL/DL configuration does not include two or more successive uplink subframes, no D2D communication is performed.

Referring again to FIG. 16, for example, when the UL/DL configuration of the TDD carrier is any of the configurations 0, 1, 3, 4 and 6, the base station 100 (the control unit 153) notifies the terminal device of the D2D resources appropriate for the UL/DL configuration. On the other hand, when the UL/DL configuration of the TDD carrier is any of the configurations 2 and 5, the base station 100 (the control unit 153) does not notify the terminal device of the D2D resources appropriate for the UL/DL configuration. That is, when the UL/DL configuration is any of the configurations 0, 1, 3, 4 and 6, D2D communication is performed, and when the UL/DL configuration is any of the configurations 2 and 5, no D2D communication is performed.

Accordingly, for example, radio resources of at least one uplink subframe included in each of the two or more successive uplink subframes may be used as the D2D resources.

Limitation of Configuration

Alternatively, the UL/DL configuration of the TDD carrier may be a configuration including two or more successive uplink subframes.

Referring again to FIG. 16, for example, the UL/DL configuration of the TDD carrier may be any of the configurations 0, 1, 3, 4 and 6. That is, the configurations 2 and 5 that do not include two or more successive uplink subframes may be excluded.

Accordingly, for example, radio resources of at least one uplink subframe included in each of the two or more successive uplink subframes may be used as the D2D resources.

(a-2) Number of Uplink Subframes

As described above, the D2D resources appropriate for the UL/DL configuration are radio resources of at least one uplink subframe of the UL/DL configuration.

The number of uplink subframes included in the at least one uplink subframe may be different according to the number of uplink subframes of the UL/DL configuration.

For example, when the number of uplink subframes of the UL/DL configuration is greater, the D2D resources appropriate for the UL/DL configuration may be radio resources of a greater number of uplink subframes. A specific example of the D2D resources will be described below with reference to FIG. 17.

Figure 17:
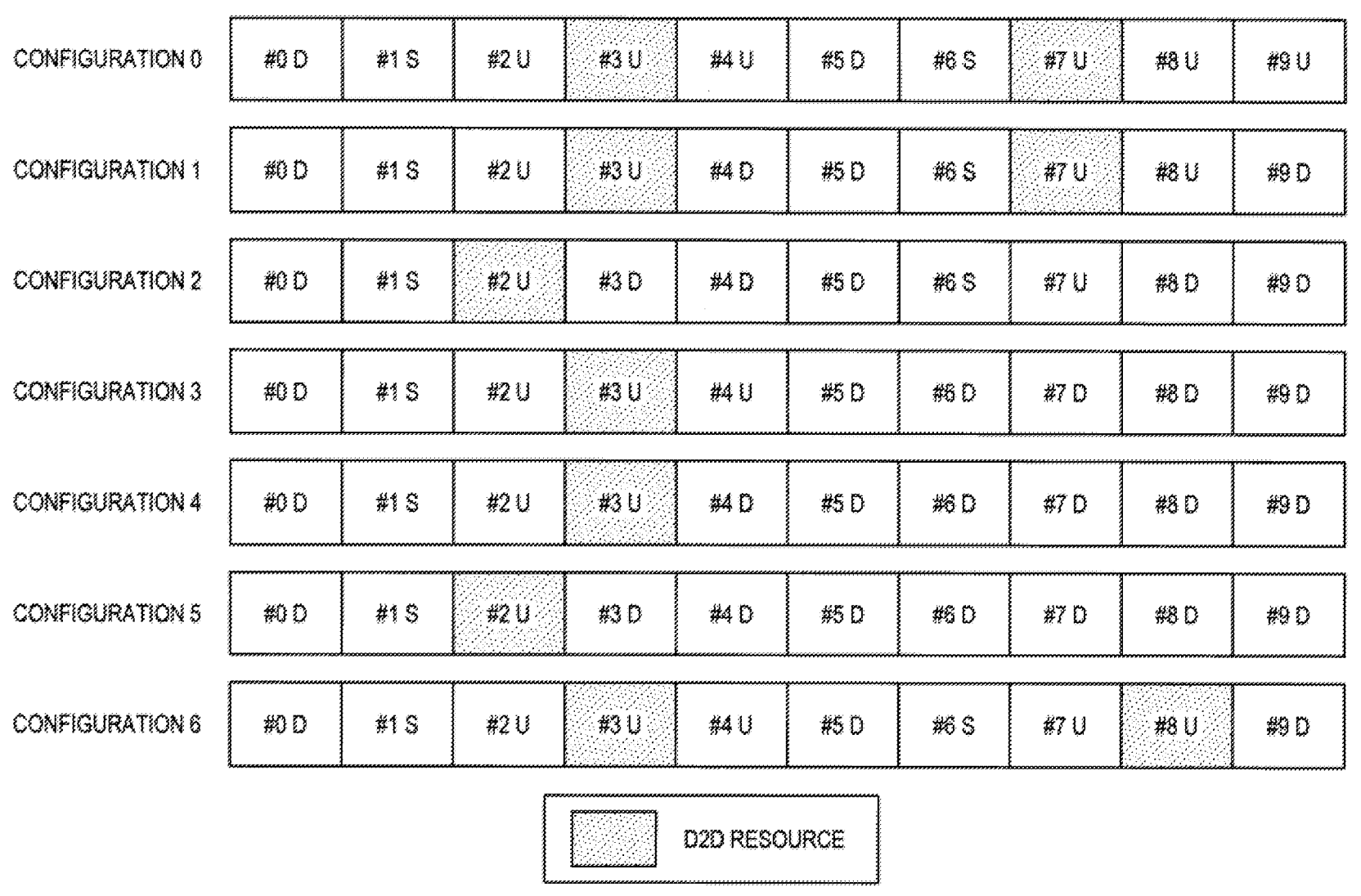

FIG. 17 is an explanatory diagram illustrating a fifth example of the D2D resources. Referring to FIG. 17, configurations 0 to 6 are illustrated. For example, the configuration 0 includes six uplink subframes. The configuration 1 includes four uplink subframes. The configuration 2 includes two uplink subframes. The configuration 3 includes three uplink subframes. The configuration 4 includes two uplink subframes. The configuration 5 includes one uplink subframe. The configuration 6 includes five uplink subframes. Since the configurations 0, 1, and 6 include great numbers of uplink subframes (for example, four or more uplink subframes), the D2D resources appropriate for each of the configurations 0, 1, and 6 are radio resources of two uplink subframes. On the other hand, since the configurations 2, 3, 4, and 5 include small numbers of uplink subframes (for example, three or fewer uplink subframes), the D2D resources appropriate for each of the configurations 2, 3, 4, and 5 are radio resources of one uplink subframe.

Accordingly, for example, it is possible to decrease a negative influence occurring in TDD radio communication between the base station and the terminal device due to D2D communication. More specifically, for example, even when the uplink subframe is unable to be used in TDD radio communication due to D2D communication, the uplink subframe used in TDD radio communication may be ensured to some extent in any configuration. Therefore, according to the configuration, a situation in which the uplink subframe is absent or the number of uplink subframes significantly decreases may be avoided. Therefore, a decrease in uplink communication quality due to a decrease of the number of uplink subframes may be suppressed.

Limitation of D2D Communication

When the number of uplink subframes of the UL/DL configuration is equal to or greater than a predetermined number, the base station 100 (the control unit 153) may notify the terminal device of the D2D resources appropriate for the UL/DL configuration. On the other hand, when the number of uplink subframes of the UL/DL configuration is less than the predetermined number, the base station 100 (the control unit 153) may not notify the terminal device of the D2D resources appropriate for the UL/DL configuration.

That is, when the number of uplink subframes of the UL/DL configuration is equal to or greater than the predetermined number, D2D communication may be performed, and when the number of uplink subframes is less than the predetermined number, no D2D communication may be performed.

As an example, the predetermined number may be 3. In this case, when the UL/DL configuration is any of the configurations 0, 1, 3, and 6, the base station 100 (the control unit 153) may notify the terminal device of the D2D resources appropriate for the UL/DL configuration. On the other hand, when the UL/DL configuration is any of the configurations 2, 4, and 5, the base station 100 (the control unit 153) may not notify the terminal device of the D2D resources appropriate for the UL/DL configuration. That is, when the UL/DL configuration is any of the configurations 0, 1, 3, and 6, D2D communication may be performed, and when the UL/DL configuration is any of the configurations 2, 4, and 5, no D2D communication may be performed.

As another example, the predetermined number may be 2. In this case, when the UL/DL configuration is any of the configurations 0, 1, 2, 3, 4, and 6, the base station 100 (the control unit 153) may notify the terminal device of the D2D resources appropriate for the UL/DL configuration. On the other hand, when the UL/DL configuration is the configuration 5, the base station 100 (the control unit 153) may not notify the terminal device of the D2D resources appropriate for the UL/DL configuration. That is, when the UL/DL configuration is any of the configurations 0, 1, 2, 3, 4, and 6, D2D communication may be performed, and when the UL/DL configuration is the configuration 5, no D2D communication may be performed.

Accordingly, for example, although the number of uplink subframes of the configuration is small, it is possible to prevent the uplink subframe from not being used in TDD radio communication due to D2D communication.

Limitation of Configuration

Alternatively, the UL/DL configuration may also be a configuration including a predetermined number or more of uplink subframes.

As an example, the predetermined number may be 3. In this case, the UL/DL configuration of the TDD carrier may be any of the configurations 0, 1, 3, and 6. That is, the configurations 2, 4, and 5 in which the number of uplink subframes is less than 3 may be excluded.

As another example, the predetermined number may be 2. In this case, the UL/DL configuration of the TDD carrier may be any of the configurations 0, 1, 2, 3, 4, and 6. That is, the configuration 5 in which the number of uplink subframes is less than 2 may be excluded.

Accordingly, for example, although the number of uplink subframes of the configuration is small, it is possible to prevent the uplink subframe from not being used in TDD radio communication due to D2D communication.

(b) Features of Period

The D2D resources appropriate for the UL/DL configuration may be periodic radio resources that are repeated at periods corresponding to the number of uplink subframes of the UL/DL configuration.

(b-1) First Example

When the number of uplink subframes of the UL/DL configuration is greater, a period of the D2D resources appropriate for the UL/DL configuration may be shorter. A specific example of the period for each configuration will be described below with reference to FIG. 18.

FIG. 18 is an explanatory diagram illustrating a first example of the period for each configuration. Referring to FIG. 18, periods and subframes of seven configurations (configurations 0 to 6) are illustrated. In this example, similar to the example illustrated in FIG. 12, the D2D resources appropriate for each of the configurations are radio resources of one uplink subframe. For example, the configurations 0, 1, and 6 include four or more uplink subframes, and a period of the D2D resources appropriate for the configurations 0, 1, and 6 is 100 ms (that is, 10 radio frames). The configurations 2, 3, and 4 include two or three uplink subframes, and a period of the D2D resources appropriate for the configurations 0, 1, and 6 is 200 ms (that is, 20 radio frames). The configuration 5 includes one uplink subframe, and a period of the D2D resources appropriate for the configuration 5 is 400 ms (that is, 40 radio frames).

Accordingly, for example, as the number of uplink subframes of the configuration is great, a greater number of D2D resources (the D2D resources having a shorter period) are ensured. Therefore, an influence of TDD radio communication between the base station and the terminal device may be suppressed and as many D2D resources as possible may be ensured.

(b-2) Second Example

When the UL/DL configuration is a first configuration, the D2D resources appropriate for the UL/DL configuration may be radio resources of an uplink subframe of a first number and may be periodic radio resources that are repeated at a first period. On the other hand, when the UL/DL configuration is a second configuration, the D2D resources appropriate for the UL/DL configuration may be radio resources of an uplink subframe of a second number that is less than the first number and may be periodic radio resources that are repeated at a second period that is shorter than the first period.

That is, the D2D resources have a longer period when the radio resources have a greater number of uplink subframes, and have a shorter period when the radio resources have a smaller number of uplink subframes. A specific example of the period for each configuration will be described below with reference to FIG. 19.

FIG. 19 is an explanatory diagram illustrating a second example of the period for each configuration. Referring to FIG. 19, periods and subframes of seven configurations (configurations 0 to 6) are illustrated. For example, the configurations 0, 1, and 6 include four or more uplink subframes, and the D2D resources appropriate for each of the configurations 0, 1, and 6 are radio resources of two uplink subframes and have a period of 400 ms (that is, 40 radio frames). In addition, the configurations 2, 3, 4, and 5 include three or fewer uplink subframes, and the D2D resources appropriate for each of the configurations 2, 3, 4, and 5 are radio resources of one uplink subframe and have a period of 200 ms (that is, 20 radio frames).

Accordingly, for example, when the number of uplink subframes of the configuration is small, the D2D resources are radio resources in which a small number of uplink subframes are included in the radio frame and that have a shorter period. Therefore, in an individual radio frame, an influence of TDD radio communication between the base station and the terminal device may be suppressed and a difference of amounts of the D2D resources between configurations may decrease.

«6. Process Flow»

Next, process examples of embodiments of the present disclosure will be described with reference to FIGS. 20 to 22.

FIRST EXAMPLE

FIG. 20 is a sequence diagram schematically illustrating a first example of a process flow according to the embodiment of the present disclosure.

The base station 100 reports system information indicating the first configuration as the UL/DL configuration of the TDD carrier (S401). In addition, the base station 100 reports system information indicating the D2D resources appropriate for the first configuration (S403).

The terminal device 200 uses the D2D resources (that is, the D2D resources appropriate for the first configuration) of which the base station 100 has notified the terminal device 200, and performs D2D communication (S405).

Then, the base station 100 determines changing of the UL/DL configuration of the TDD carrier from the first configuration to the second configuration, and reports system information indicating the second configuration as the UL/DL configuration (S407). In addition, the base station 100 reports system information indicating the D2D resources appropriate for the second configuration (S409).

The terminal device 200 uses the D2D resources (that is, the D2D resources appropriate for the second configuration) of which the base station 100 has notified the terminal device 200, and performs D2D communication (S411).

SECOND EXAMPLE

FIG. 21 is a sequence diagram schematically illustrating a second example of a process flow according to the embodiment of the present disclosure.

The base station 100 reports system information indicating the first configuration as the UL/DL configuration of the TDD carrier (S421). In addition, the base station 100 reports system information indicating the D2D resources appropriate for each of the multiple configurations (S423). Especially, in this example, the base station 100 reports system information indicating the D2D resources for each configuration included in the multiple configurations.

The terminal device 200 uses the D2D resources appropriate for the first configuration among the D2D resources appropriate for each of the multiple configurations and performs D2D communication (S425).

Then, the base station 100 determines changing of the UL/DL configuration of the TDD carrier from the first configuration to the second configuration, and reports system information indicating the second configuration as the UL/DL configuration (S427).

The terminal device 200 uses the D2D resources appropriate for the second configuration among the D2D resources appropriate for each of the multiple configurations and performs D2D communication (S429).

THIRD EXAMPLE

FIG. 22 is a sequence diagram schematically illustrating a third example of a process flow according to the embodiment of the present disclosure.

The base station 100 reports system information indicating the first configuration as the UL/DL configuration of the TDD carrier (S441). In addition, the base station 100 reports system information indicating the D2D resources appropriate for each of the multiple configurations (S443). Especially, in this example, the base station 100 reports system information indicating the radio resources of the uplink subframe common among the multiple configurations. Further, for example, the radio resources may be the D2D resources (that is, the D2D resources whose subframe, period and offset are common among the multiple configurations) common among the multiple configurations.

The terminal device 200 uses the D2D resources (that is, the D2D resources common among the multiple configurations) of which the base station 100 has notified the terminal device 200 and performs D2D communication (S445).

Also, for example, the base station 100 then changes the UL/DL configuration of the TDD carrier from the first configuration to the second configuration. Regardless of this change, the terminal device 200 continuously uses the D2D resources (that is, the D2D resources common among the multiple configurations) and performs D2D communication.

«7. Applications»

Technology according to one or more of the embodiments of the present disclosure is applicable to various products. A base station 100 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 100 may be realized as any other types of base stations such as a NodeB and a base transceiver station (BTS). The base station 100 may include a main body (that is also referred to as a base station device) configured to control radio communication, and one or more remote radio heads (RRH) disposed in a different place from the main body. Additionally, various types of terminals to be discussed later may also operate as the base station 100 by temporarily or semi-permanently executing a base station function. Further, at least some of structural elements of the base station 100 may be realized in the base station device or in a module for the base station device.

For example, the terminal device 200 may be realized as a mobile terminal such as a smartphone, a tablet personal computer (PC), a notebook PC, a portable game terminal, a portable/dongle type mobile router, and a digital camera, or an in-vehicle terminal such as a car navigation device. The terminal device 200 may also be realized as a terminal (that is also referred to as a machine type communication (MTC) terminal) that performs machine-to-machine (M2M) communication. Furthermore, at least some of structural elements of the terminal device 200 may be a module (such as an integrated circuit module including a single die) mounted on each of the terminals.

<7.1. Application Related to Base Station>
(First Application)

FIG. 23 is a block diagram illustrating a first example of a schematic configuration of an eNB to which an embodiment of the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 23. For example, the multiple antennas 810 may be compatible with multiple frequency bands used by the eNB 800. Although FIG. 23 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data). The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 23. For example, the multiple BB processors 826 may be compatible with multiple frequency bands used by the eNB 800. The radio communication interface 825 may include the multiple RF circuits 827, as illustrated in FIG. 23. For example, the multiple RF circuits 827 may be compatible with multiple antenna elements. Although FIG. 23 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 23, the control unit 153 (and the information acquisition unit 151) described with reference to FIG. 9 may be implemented in the radio communication interface 825. Alternatively, at least some of these components may also be implemented in the controller 821. As an example, the eNB 800 may mount a module including a part (for example, the BB processor 826) or the entire radio communication interface 825 and/or the controller 821, and the control unit 153 (and the information acquisition unit 151) may be implemented in the module. In this case, the module may store a program (in other words, a program causing the processor to execute operations of the control unit 153 (and the information acquisition unit 151)) causing the processor to function as the control unit 153 (and the information acquisition unit 151), and execute the program. As another example, a program causing the processor to function as the control unit 153 (and the information acquisition unit 151) may be installed in the eNB 800, and the radio communication interface 825 (for example, the BB processor 826) and/or the controller 821 may execute the program. As described above, as a device including the control unit 153 (and the information acquisition unit 151), the eNB 800, the base station device 820 or the module may be provided. A program causing the processor to function as the control unit 153(and the information acquisition unit 151) may also be provided. In addition, a readable recording medium in which the program is recorded may be provided.

In addition, in the eNB 800 illustrated in FIG. 23, the radio communication unit 120 described with reference to FIG. 10 may be implemented in the radio communication interface 825 (for example, the RF circuit 827). In addition, the antenna unit 110 may be implemented in the antenna 810. In addition, the network communication unit 130 may be implemented in the controller 821 and/or the network interface 823.

(Second Application)

FIG. 24 is a block diagram illustrating a second example of a schematic configuration of an eNB to which an embodiment of the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 24. For example, the multiple antennas 840 may be compatible with multiple frequency bands used by the eNB 830. Although FIG. 24 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 23.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 23, except the BB processor 856 is connected to the RF circuit 864 of the RRH 860 via the connection interface 857. The radio communication interface 855 may include the multiple BB processors 856, as illustrated in FIG. 24. For example, the multiple BB processors 856 may be compatible with multiple frequency bands used by the eNB 830. Although FIG. 24 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 24. For example, the multiple RF circuits 864 may support multiple antenna elements. Although FIG. 24 illustrates the example in which the radio communication interface 863 includes the multiple RF circuits 864, the radio communication interface 863 may also include a single RF circuit 864.

In the eNB 830 illustrated in FIG. 24, the control unit 153 (and the information acquisition unit 151) described with reference to FIG. 10 may be implemented in the radio communication interface 855 and/or the radio communication interface 863. Alternatively, at least some of these components may also be implemented in the controller 851. As an example, the eNB 830 may mount a module including a part (for example, the BB processor 856) or the entire radio communication interface 855 and/or the controller 851, and the control unit 153 (and the information acquisition unit 151) may be implemented in the module. In this case, the module may store a program (in other words, a program causing the processor to execute operations of the control unit 153 (and the information acquisition unit 151)) causing the processor to function as the control unit 153 (and the information acquisition unit 151), and execute the program. As another example, a program causing the processor to function as the control unit 153 (and the information acquisition unit 151) may be installed in the eNB 830, and the radio communication interface 855 (for example, the BB processor 856) and/or the controller 851 may execute the program. As described above, as a device including the control unit 153 (and the information acquisition unit 151), the eNB 830, the base station device 850 or the module may be provided. A program causing the processor to function as the control unit 153 (and the information acquisition unit 151) may also be provided. In addition, a readable recording medium in which the program is recorded may be provided.

In addition, in the eNB 830 illustrated in FIG. 24, for example, the radio communication unit 120 described with reference to FIG. 10 may be implemented in the radio communication interface 863 (for example, the RF circuit 864). In addition, the antenna unit 110 may be implemented in the antenna 840. In addition, the network communication unit 130 may be implemented in the controller 851 and/or the network interface 853.

<7.2. Applications Related to Terminal Device>
(First Application)

FIG. 25 is a block diagram illustrating an example of a schematic configuration of a smartphone 900 to which an embodiment of the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 25. Although FIG. 25 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 25. Although FIG. 25 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 25 via feeder lines, which are partially shown as dashed lines in the figure. The auxiliary controller 919 operates a minimum necessary function of the smartphone 900, for example, in a sleep mode.

In the smartphone 900 illustrated in FIG. 25, the information acquisition unit 241 and the control unit 243 described with reference to FIG. 10 may be implemented in the radio communication interface 912. Alternatively, at least some of these components may also be implemented in the processor 901 or the auxiliary controller 919. As an example, the smartphone 900 may mount a module including a part (for example, the BB processor 913) or the entire radio communication interface 912, the processor 901 and/or the auxiliary controller 919, and the information acquisition unit 241 and the control unit 243 may be implemented in the module. In this case, the module may store a program (in other words, a program causing the processor to execute operations of the information acquisition unit 241 and the control unit 243) causing the processor to function as the information acquisition unit 241 and the control unit 243, and execute the program. As another example, a program causing the processor to function as the information acquisition unit 241 and the control unit 243 may be installed in the smartphone 900, and the radio communication interface 912 (for example, the BB processor 913), the processor 901 and/or the auxiliary controller 919 may execute the program. As described above, as a device including the information acquisition unit 241 and the control unit 243, the smartphone 900 or the module may be provided. A program causing the processor to function as the information acquisition unit 241 and the control unit 243 may also be provided.

In addition, in the smartphone 900 illustrated in FIG. 25, for example, the radio communication unit 220 described with reference to FIG. 11 may be implemented in the radio communication interface 912 (for example, the RF circuit 914). In addition, the antenna unit 210 may be implemented in the antenna 916.

(Second Application)

FIG. 26 is a block diagram illustrating an example of a schematic configuration of a car navigation device 920 to which an embodiment of the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 26. Although FIG. 26 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 26. Although FIG. 26 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 26 via feeder lines that are partially shown as dashed lines in the figure. The battery 938 accumulates power supplied form the vehicle.

In the car navigation device 920 illustrated in FIG. 26, the information acquisition unit 241 and the control unit 243 described with reference to FIG. 11 may be implemented in the radio communication interface 933. Alternatively, at least some of these components may also be implemented in the processor 921. As an example, the car navigation device 920 may mount a module including a part (for example, the BB processor 934) or the entire radio communication interface 933 and/or the processor 921, and the information acquisition unit 241 and the control unit 243 may be implemented in the module. In this case, the module may store a program (in other words, a program causing the processor to execute operations of the information acquisition unit 241 and the control unit 243) causing the processor to function as the information acquisition unit 241 and the control unit 243, and execute the program. As another example, a program causing the processor to function as the information acquisition unit 241 and the control unit 243 may be installed in the car navigation device 920, and the radio communication interface 933 (for example, the BB processor 934) and/or the processor 921 may execute the program. As described above, as a device including the information acquisition unit 241 and the control unit 243, the car navigation device 920 or the module may be provided. A program causing the processor to function as the information acquisition unit 241 and the control unit 243 may also be provided.

In addition, in the car navigation device 920 illustrated in FIG. 26, for example, the radio communication unit 220 described with reference to FIG. 11 may be implemented in the radio communication interface 933 (for example, the RF circuit 935). In addition, the antenna unit 210 may be implemented in the antenna 937.

Embodiments of the technology of the present disclosure may also be realized as an in-vehicle system (or a vehicle) 940 including one or more blocks of the car navigation device 920, the in-vehicle network 941, and a vehicle module 942. That is, as a device including the information acquisition unit 241 and the control unit 243, the in-vehicle system (or the vehicle) 940 may be provided. The vehicle module 942 generates vehicle data such as vehicle speed, engine speed, and trouble information, and outputs the generated data to the in-vehicle network 941.

«8. Conclusion»

Respective devices and respective processes according to the embodiments of the present disclosure have been described above with reference to FIGS. 1 to 26.

According to the embodiment of the present disclosure, the base station 100 includes the control unit 153 configured to dynamically change the UL/DL configuration of the TDD carrier. The control unit 153 notifies the terminal device of the radio resources for D2D communication appropriate for the UL/DL configuration. The radio resources are the radio resources of at least one uplink subframe of the UL/DL configuration.

In addition, according to the embodiment of the present disclosure, the information acquisition unit 241 configured to acquire information indicating the radio resources for D2D communication appropriate for the UL/DL configuration of the TDD carrier that is dynamically changed by the base station 100 and the control unit 243 configured to control D2D communication using the radio resources are included. The radio resources are radio resources of at least one uplink subframe of the UL/DL configuration.

Accordingly, for example, the terminal device can appropriately perform D2D communication under the TDD environment.

It should be understood by those skilled in the art that various modifications, combinations, sub-combinations and alterations may occur depending on design requirements and other factors insofar as they are within the scope of the appended claims or the equivalents thereof.

For example, while the first technical features and the second technical features have been described, the first technical features and the second technical features not have to be used in conjunction.

For example, the first technical features may be used without using the second technical features.

For example, the second technical features may be used without using the first technical features. In this case, the UL/DL configuration of the TDD carrier may not be dynamically changed. As an example, the base station (the information acquisition unit) may acquire information indicating the D2D resources appropriate for the UL/DL configuration (it is not dynamically changed). Therefore, the base station (the control unit) may notify the terminal device of the D2D resources. The D2D resources may be the radio resources of at least one uplink subframe of the UL/DL configuration. Therefore, the second technical features (that is, any of the second technical features) may be applied to the D2D resources.

For example, the example in which the communication system is a system compliant with LTE, LTE-Advanced, or communication standards conforming thereto has been described, but the present disclosure is not limited to the example. For example, the communication system may be a system compliant with other communication standards.

Also, the processing steps in a process in this specification are not strictly limited to being executed in a time series following the sequence described in a flowchart. For example, the processing steps in a process may be executed in a sequence that differs from a sequence described herein as a flowchart, and furthermore may be executed in parallel.

In addition, a computer program (in other words, a computer program causing the processor to execute operations of components of the device) causing the processor (for example, the CPU and the DSP) included in devices (for example, the base station, the base station device for the base station, or a module for the base station device, or the terminal device or the module for the terminal device) of this specification to function as components (for example, the information acquisition unit and/or the control unit) of the device can be created. In addition, a recording medium in which the computer program is recorded may be provided. In addition, a device (for example, a finished product or a module (for example, a component, a processing circuit or a chip) for the finished product) including a memory in which the computer program is stored and one or more processors capable of executing the computer program may be provided. In addition, a method including operations of components (for example, the information acquisition unit and/or the control unit) of the device may be included in the embodiments of the technology according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A device including:
circuitry configured to
dynamically change an uplink/downlink configuration of a time division duplex (TDD) carrier, and
notify a terminal device of a radio resource for device-to-device communication for the uplink/downlink configuration,
wherein the radio resource is a radio resource of at least one uplink subframe of the uplink/downlink configuration.

(2)

The device according to (1), wherein the circuitry is further configured to change the uplink/downlink configuration from one configuration among multiple configurations to another configuration among the multiple configurations.

(3)

The device according to (2),
wherein the circuitry is further configured to notify the terminal device of the radio resource for device-to-device communication for the other configuration in accordance with the change of the uplink/downlink configuration, and
wherein the radio resource for the another configuration is a radio resource of at least one uplink subframe of the another configuration.

(4)

The device according to (2), wherein the circuitry is further configured to notify the terminal device of the radio resource for device-to-device communication for each of the multiple configurations.

(5)

The device according to (4),
wherein the radio resource for each of the multiple configurations includes a radio resource for device-to-device communication for each configuration, and
wherein the radio resource for each configuration is a radio resource of at least one uplink subframe of the configuration.

(6)

The device according to (4), wherein the radio resource for each of the multiple configurations is a radio resource of at least one uplink subframe common among the multiple configurations.

(7)

The device according to any one of (1) to (5), wherein a number of uplink subframes included in the at least one uplink subframe differs according to a number of uplink subframes of the uplink/downlink configuration.

(8)

The device according to any one of (1) to (7), wherein the radio resource is a periodic radio resource that is repeated at a period corresponding to a number of uplink subframes of the uplink/downlink configuration.

(9)

The device according to any one of (1) to (8), wherein the radio resource is a radio resource of an uplink subframe of a first number and is a periodic radio resource that is repeated at a first period when the uplink/downlink configuration is a first configuration, and the radio resource is a radio resource of an uplink subframe of a second number that is less than the first number and is a periodic radio resource that is repeated at a second period shorter than the first period when the uplink/downlink configuration is a second configuration.

(10)

The device according to any one of (1) to (9), wherein the circuitry is further configured to notify the terminal device of the radio resource when a number of uplink subframes of the uplink/downlink configuration is equal to or greater than a predetermined number.

(11)

The device according to any one of (1) to (9), wherein the uplink/downlink configuration is a configuration including at least a predetermined number of uplink subframes.

(12)

The device according to any one of (1) to (11),
wherein each of the at least one uplink subframe is included in two or more successive uplink subframes of the uplink/downlink configuration, and
wherein one or more uplink subframes of the two or more successive uplink subframes are not included in the at least one uplink subframe.

(13)

The device according to (12), wherein the circuitry is further configured to notify the terminal device of the radio resource when the uplink/downlink configuration includes two or more successive uplink subframes.

(14)

The device according to (12), wherein the uplink/downlink configuration is a configuration including two or more successive uplink subframes.

(15)

The device according to any one of (1) to (14), wherein the circuitry is further configured to notify the terminal device of the radio resource by reporting system information indicating the radio resource.

(16)

The device according to any one of (1) to (15), wherein the circuitry is further configured to notify control unit notifies the terminal device of the uplink/downlink configuration.

(17)

A method including:
dynamically changing, by a processor, an uplink/downlink configuration of a time division duplex (TDD) carrier; and
notifying a terminal device of a radio resource for device-to-device communication for the uplink/downlink configuration,
wherein the radio resource is a radio resource of at least one uplink subframe of the uplink/downlink configuration.

(18)

A device including:
circuitry configured to
acquire information indicating a radio resource for device-to-device communication for an uplink/downlink configuration of a time division duplex (TDD) carrier that is dynamically changed by a base station; and
control device-to-device communication using the radio resource,
wherein the radio resource is a radio resource of at least one uplink subframe of the uplink/downlink configuration.

(19)
The device according to (18),
wherein the uplink/downlink configuration is a configuration that is changed from one configuration among multiple configurations to another configuration among the multiple configurations, and
wherein the circuitry is further configured to acquire information indicating the radio resource for the uplink/downlink configuration among radio resources for device-to-device communication appropriate for the respective multiple configurations on the basis of the uplink/downlink configuration.
(20)
A method including:
acquiring information indicating a radio resource for device-to-device communication for an uplink/downlink configuration of a time division duplex (TDD) carrier that is dynamically changed by a base station; and
controlling, by a processor, device-to-device communication using the radio resource, wherein the radio resource is a radio resource of at least one uplink subframe of the uplink/downlink configuration.
(21)
A program causing a processor to execute:
dynamically changing an uplink/downlink configuration of a time division duplex (TDD) carrier; and
notifying a terminal device of a radio resource for device-to-device communication for the uplink/downlink configuration,
wherein the radio resource is a radio resource of at least one uplink subframe of the uplink/downlink configuration.
(22)
A non-transitory computer-readable recording medium having a program stored thereon, the program causing a processor to execute:
dynamically changing an uplink/downlink configuration of a time division duplex (TDD) carrier; and
notifying a terminal device of a radio resource for device-to-device communication appropriate for the uplink/downlink configuration,
wherein the radio resource is a radio resource of at least one uplink subframe of the uplink/downlink configuration.
(23)
A program causing a processor to execute:
acquiring information indicating a radio resource for device-to-device communication for an uplink/downlink configuration of a time division duplex TDD carrier that is dynamically changed by a base station; and
controlling device-to-device communication using the radio resource,
wherein the radio resource is a radio resource of at least one uplink subframe of the uplink/downlink configuration.
(24)
A non-transitory computer-readable recording medium having a program stored thereon, the program causing a processor to execute:
acquiring information indicating a radio resource for device-to-device communication for an uplink/downlink configuration of a time division duplex TDD carrier that is dynamically changed by a base station; and
controlling device-to-device communication using the radio resource,
wherein the radio resource is a radio resource of at least one uplink subframe of the uplink/downlink configuration.

REFERENCE SIGNS LIST 1 communication system
100 base station
101 cell
150 processing unit
151 information acquisition unit
153 control unit
200 terminal device
240 processing unit
241 information acquisition unit
243 control unit

The invention claimed is:

1. A device, comprising:
circuitry configured to
dynamically change an uplink/downlink (UL/DL) configuration of a time division duplex (TDD) carrier from one UL/DL configuration of a plurality UL/DL configurations to another UL/DL configuration of the plurality of UL/DL configuration;
notify a terminal device of first scheduling information that indicates the changes made to the UL/DL configuration; and
notify the terminal device of second scheduling information that indicates a radio resource for device-to-device (D2D) communication on the TDD carrier, subframe information of at least one uplink subframe of the UL/DL configuration, and period information indicating a period of the radio resource, wherein
radio resource is among a plurality of radio resources,
each radio resource of the plurality of radio resources corresponding to a respective UL/DL configuration of the plurality of UL/DL configurations, and
the terminal device acquires the first scheduling information and the second scheduling information based on the notifying performed by the circuitry.

2. The device according to claim 1, wherein the circuitry is further configured to notify the terminal device of scheduling information indicating another radio resource for D2D communication, the another radio resource corresponding to another UL/DL configuration.

3. The device according to claim 1, wherein a number of subframes included in the at least one subframe depends on a number of subframes of the UL/DL configuration.

4. The device according to claim 1, wherein the radio resource is repeated at the period, which corresponds to a number of subframes of the UL/DL configuration.

5. The device according to claim 1, wherein the circuitry is further configured to notify the terminal device of the second scheduling information indicating the radio resource in response to a number of subframes of the UL/DL configuration being equal to or greater than a predetermined number.

6. The device according to claim 1, wherein the UL/DL configuration includes at least a predetermined number of uplink subframes.

7. The device according to claim 1, wherein the UL/DL configuration includes two or more successive uplink subframes.

8. The device according to claim 1, wherein the circuitry is further configured to notify the terminal device of the second scheduling information indicating the radio resource by reporting system information indicating the radio resource.

9. The device according to claim 1, wherein the circuitry is further configured to notify the terminal device of the UL/DL configuration.

10. A method, comprising:
acquiring, based on a notification provided by a base station, first scheduling information that indicates an uplink/downlink (UL/DL) configuration of a time division duplex (TDD) carrier that is dynamically changed by the base station from one UL/DL configuration of a plurality UL/DL configurations to another UL/DL configuration of the plurality of UL/DL configuration;

acquiring, based on the notification, second scheduling information that indicates a radio resource for device-to-device (D2D) communication on the TDD carrier, subframe information of at least one uplink subframe of the UL/DL configuration, and period information indicating a period of the radio resource; and controlling, by circuitry, D2D communication using the radio resource, wherein the radio resource is among a plurality of radio resources, and each radio resource of the plurality of radio resources corresponds to a respective UL/DL configuration of the plurality of UL/DL configurations.

11. A terminal device, comprising:

circuitry configured to acquire, based on a notification provided by a base station, first scheduling information that indicates an uplink/downlink (UL/DL) configuration of a time division duplex (TDD) carrier that is dynamically changed by the base station from one UL/DL configuration of a plurality UL/DL configurations to another UL/DL configuration of the plurality of UL/DL configuration;

acquire, based on the notification, second scheduling information that indicates a radio resource for device-to-device (D2D) communication on the TDD carrier, subframe information of at least one uplink subframe of the UL/DL configuration, and period information indicating a period of the radio resource; and control D2D communication using the radio resource, wherein the radio resource is among a plurality of radio resources, and each radio resource of the plurality of radio resources corresponds to a respective UL/DL configuration of the plurality of UL/DL configurations.

12. A method, comprising:

dynamically changing, by circuitry, an uplink/downlink (UL/DL) configuration of a time division duplex (TDD) carrier from one UL/DL configuration of a plurality UL/DL configurations to another UL/DL configuration of the plurality of UL/DL configuration;

notifying a terminal device of first scheduling information that indicates the changes made to the UL/DL configuration; and notifying the terminal device of second scheduling information that indicates a radio resource for device-to-device (D2D) communication on the TDD carrier, subframe information of at least one uplink subframe of the UL/DL configuration, and period information indicating a period of the radio resource, wherein the radio resource is among a plurality of radio resources, each radio resource of the plurality of radio resources corresponding to a respective UL/DL configuration of the plurality of UL/DL configurations, and the terminal device acquires the first scheduling information and the second scheduling information based on both of the notifying.

13. The method according to claim 12, further comprising notifying the terminal device of scheduling information indicating another radio resource for D2D communication, the another radio resource corresponding to another UL/DL configuration.

14. The method according to claim 12, wherein a number of subframes included in the at least one subframe depends on a number of subframes of the UL/DL configuration.

15. The method according to claim 12, wherein the radio resource is repeated at the period, which corresponds to a number of subframes of the UL/DL configuration.

16. The method according to claim 12, further comprising second notifying the terminal device of the second scheduling information indicating the radio resource in response to a number of subframes of the UL/DL configuration being equal to or greater than a predetermined number.

17. The method according to claim 12, wherein the UL/DL configuration includes at least a predetermined number of uplink subframes.

18. The method according to claim 12, wherein the UL/DL configuration includes two or more successive uplink subframes.

19. A device, comprising:

circuitry configured to set an uplink/downlink (UL/DL) configuration of a time division duplex (TDD) carrier by dynamically changing from one UL/DL configuration of the plural UL/DL configurations to another UL/DL configuration of the plural UL/DL configuration;

notify a terminal device of first scheduling information that indicates the UL/DL configuration; and notify the terminal device of second scheduling information that indicates a radio resource for device-to-device (D2D) communication on the TDD carrier, subframe information of at least one uplink subframe of the UL/DL configuration, and period information indicating a period of the radio resource, wherein the radio resource is among a plurality of radio resources, each radio resource of the plurality of radio resources corresponding to a respective UL/DL configuration of the plurality of UL/DL configurations, and the terminal device acquires the first scheduling information and the second scheduling information based on the notifying performed by the circuitry.

20. The device according to claim 19, wherein the radio resource is periodic, the radio resource is repeated at a first period in response to the UL/DL configuration being a first configuration, and the radio resource is repeated at a second period shorter than the first period in response to the UL/DL configuration being a second configuration, the second configuration being different than the first configuration.

* * * * *